US011402484B2

(12) United States Patent
Ogura

(10) Patent No.: US 11,402,484 B2
(45) Date of Patent: Aug. 2, 2022

(54) OBJECT DETECTION DEVICE, IN-VEHICLE RADAR SYSTEM, MONITORING RADAR SYSTEM, OBJECT DETECTION METHOD OF OBJECT DETECTION DEVICE, AND PROGRAM

(71) Applicant: NEC Corporation, Tokyo (JP)

(72) Inventor: Kazumine Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 16/613,198

(22) PCT Filed: Apr. 27, 2018

(86) PCT No.: PCT/JP2018/017214
§ 371 (c)(1),
(2) Date: Nov. 13, 2019

(87) PCT Pub. No.: WO2018/211948
PCT Pub. Date: Nov. 22, 2018

(65) Prior Publication Data
US 2021/0080556 A1 Mar. 18, 2021

(30) Foreign Application Priority Data

May 17, 2017 (JP) .............................. JP2017-098561

(51) Int. Cl.
G01S 13/536 (2006.01)
B60W 10/06 (2006.01)
(Continued)

(52) U.S. Cl.
CPC ........... G01S 13/536 (2013.01); B60W 10/06 (2013.01); B60W 10/18 (2013.01); B60W 30/09 (2013.01);
(Continued)

(58) Field of Classification Search
CPC ...... G01S 13/536; G01S 7/354; G01S 13/931; G01S 7/356; G01S 2013/93185;
(Continued)

(56) References Cited

U.S. PATENT DOCUMENTS

2002/0180633 A1* 12/2002 Nakanishi ............... G01S 7/352
342/70
2009/0015464 A1* 1/2009 Fukuda ................. G01S 13/325
342/194
(Continued)

FOREIGN PATENT DOCUMENTS

JP 2012-229948 A 11/2012
JP 2013-145205 A 7/2013
(Continued)

OTHER PUBLICATIONS

International Search Report for PCT Application No. PCT/JP2018/017214, dated Jul. 24, 2018.
(Continued)

Primary Examiner — Marthe Y Marc-Coleman

(57) ABSTRACT

An object detection device including a receiver, wherein the receiver has: a reception unit that receives an RF reception signal that is a reflection of an RF transmission signal reflected from at least one target; an IF signal generation unit that generates an IF signal; a position detection unit that detects a position of the target based on an amplitude in a spectrum computed from the IF signal; a displacement detection unit that detects a displacement of the target based on a phase in a one-dimensional spectrum at the position; a speed detection unit that detects a speed of the target based on a plurality of the IF signals; and a target determination unit that identifies a type of the target by using detection results and detection results, or detection results from the displacement detection unit, environmental information defined at each position, and detection results.

11 Claims, 26 Drawing Sheets

(51) Int. Cl.
  B60W 10/18   (2012.01)
  B60W 30/09   (2012.01)
  G01S 7/35    (2006.01)
  G01S 13/931  (2020.01)
  G08G 1/16    (2006.01)
  G06V 20/58   (2022.01)

(52) U.S. Cl.
  CPC ............ G01S 7/354 (2013.01); G01S 13/931 (2013.01); G06V 20/58 (2022.01); G08G 1/166 (2013.01); *B60W 2420/52* (2013.01); *G01S 7/356* (2021.05); *G01S 2013/93185* (2020.01)

(58) Field of Classification Search
  CPC ...... G01S 13/584; G01S 13/34; B60W 10/06; B60W 10/18; B60W 30/09; B60W 2420/52; G06K 9/00805; G06K 9/00362; G06K 9/00335; G08G 1/166; G08G 1/165
  See application file for complete search history.

(56) References Cited

U.S. PATENT DOCUMENTS

| | | | |
|---|---|---|---|
| 2014/0333467 A1 | 11/2014 | Inomata | |
| 2015/0301167 A1* | 10/2015 | Sentelle | G01S 13/888 342/22 |
| 2015/0331096 A1 | 11/2015 | Schoor et al. | |

FOREIGN PATENT DOCUMENTS

| | | |
|---|---|---|
| JP | 2013-167554 A | 8/2013 |
| JP | 2016-156751 A | 9/2016 |

OTHER PUBLICATIONS

Mac Fujimoto and Yusuke Takemoto, "Senshin unten shien system(ADAS) WO jitsugen suru tame No. 76/79 GHz-tai milli-ha radar system solution FTF-AUT-F0736" [76/79 GHz-band millimeter wave radar system solution for realizing advanced driving assistance system (ADAS): FTF-AUT-F0736], [online] Freescale Technology Forum 2014, retrieved Apr. 26, 2016, Japan internet<URL: http://www.nxp.com/ja/files/FTF-AUT-F0736.pdf?fsrch=1&sr=2&pageNum=1> with an English partial translation thereof.

Yamanouchi et al., "Multiple-object Recognition Radar Based on Multiple-peak Interferometry", Proceedings 1 of communication society in conference of IEICE, Sep. 2016, Japan, p. 411.

Ogura et al., "Multi-Object Micro-Displacement Measurement by Multi-Spectral-Peak Radar Interferometry using Spectrum Phase Information", IEICE Technical Report SR2017-21, May 2017, Japan, p. 123-126.

Japanese Office Action for JP Application No. 2019-519160 dated Jul. 21, 2020 with English Translation.

Matsuo et al., "Experimental Verification of Multiple-object Recognition Radar Based on Multiple-peak Interferometry", IEICE, Sep. 6, 2016, p. 412, B-17-13, ISSN 1349-1415, Sapporo-city Japan.

* cited by examiner

|  | TARGET A | TARGET B | TARGET C |
|---|---|---|---|
| SPEED | ○ (NON-ZERO) | × (0) | × (0) |
| FLUCTUATIONS | ○ (YES) | ○ (YES) | × (NO) |
| IDENTIFICATION RESULT | PEDESTRIAN | MOTIONLESS PERSON | MOTIONLESS OBJECT |

FIG. 20

| PARAMETER | VALUE |
|---|---|
| FREQUENCY $f_{center}$ | 24.15 GHz |
| BANDWIDTH $BW$ | 180 MHz |
| CHIRP LENGTH $T_{chirp}$ | 310 µs |
| CHIRP INTERVAL $T_{period}$ | 1 ms |
| NUMBER OF SAMPLES $n$ | 504 |
| DFT FRAME LENGTH IN PROCESS 2 $N$ | 1024 |
| CONSECUTIVE NUMBER OF CHIRPS $m$ | 32 |
| DFT FRAME LENGTH IN PROCESS 4 $M$ | 512 |
| SAMPLING FREQUENCY $f_{samp}$ | 1.8 MHz |
| TRANSMISSION POWER $P_t$ | 8 dBm |
| ANTENNA GAIN $G_{ant}$ | 15 dB |

OBJECT DETECTION DEVICE, IN-VEHICLE RADAR SYSTEM, MONITORING RADAR SYSTEM, OBJECT DETECTION METHOD OF OBJECT DETECTION DEVICE, AND PROGRAM

This application is a National Stage Entry of PCT/JP2018/017214 filed on Apr. 27, 2018, which claims priority from Japanese Patent Application 2017-098561 filed on May 17, 2017, the contents of all of which are incorporated herein by reference, in their entirety.

TECHNICAL FIELD

The present invention relates to an object detection device, an in-vehicle radar system, a monitoring radar system, an object detection method of the object detection device, and a program.

BACKGROUND ART

Automobiles that run by automated driving are being developed. In automobiles that run by automated driving, it is important to ensure safety. In order to ensure safety, technologies for avoiding collisions are indispensable. In recent years, particularly for the purpose of protecting pedestrians, there has been a focus on the avoidance of collisions with pedestrians. In order to avoid collisions with pedestrians, it is necessary to correctly detect pedestrians.

Non-Patent Document 1 describes, as a related technology, a technology for detecting objects by using an FMCW (Frequency-Modulated Continuous-Wave) scheme or a Fast-FMCW scheme in an in-vehicle radar system.

CITATION LIST

Non-Patent Literature

[Non-Patent Document 1] Mac Fujimoto and Yusuke Takemoto, Senshin unten shien system (ADAS) wo jitsugen suru tame no 76/79 GHz-tai milli-ha radar system solution FTF-AUT-F0736 [76/79 GHz-band millimeter wave radar system solution for realizing advanced driving assistance system (ADAS): FTF-AUT-F0736], [online], FREESCALE TECHNOLOGY FORUM 2014, [retrieved Apr. 26, 2016], internet<URL: http://www.nxp.com/ja/files/FTF-AUT-F0736.pdf?fsrch=1&sr=2&pageNum=1>

SUMMARY OF INVENTION

Problem to be Solved by the Invention

When detecting objects using, for example, an FMCW scheme or a Fast-FMCW scheme as described in Non-Patent Document 1, it is common for the range resolution to be approximately 0.3 meters, as described in page 13 and 15 in Non-Patent Document 1. This range resolution arises because the properties of Fourier transforms that are used in the FMCW scheme and the Fast-FMCW scheme limit the values of the ranges that can be detected to discrete values in increments of c/(2BW). The symbol c denotes the speed of light. The symbol BW denotes the bandwidth of the RF (Radio Frequency) signal. If BW is 500 MHz, then the range resolution becomes 0.3 meters. For this reason, when an FMCW scheme or Fast-FMCW scheme is used to detect objects, it is not possible to detect movements that are small in comparison to the range resolution. For example, even if a person is moving or the person is performing an action such as waving a hand, there are cases in which that movement cannot be detected because the range resolution is too low in comparison to the size of the movement of the object to be detected. As a result thereof, people are detected as simple motionless objects that do not move or perform actions, and are not detected as moving bodies.

Therefore, a technology that can detect moving bodies without using complicated processes or special equipment has been sought.

An objective of the present invention is to provide an object detection device, an in-vehicle radar system, a monitoring radar system, an object detection method of the object detection device, and a program that can solve the above-mentioned problems.

Means for Solving the Problem

In order to achieve the above-mentioned objective, according to one embodiment of the present invention, an object detection device includes a receiver which includes: a reception unit configured to receive an RF reception signal that is a reflection of an RF transmission signal reflected from at least one target, the RF transmission signal having a frequency that is periodically swept; an IF (Intermediate Frequency) signal generation unit configured to generate an IF signal by mixing the RF transmission signal with the RF reception signal; a position detection unit configured to detect a position of the target based on an amplitude in a spectrum computed from the IF signal having a frequency that is periodically swept; a displacement detection unit configured to detect a displacement of the target based on a phase in a one-dimensional spectrum at the position of the target detected by the position detection unit, the phase in the one-dimensional spectrum being computed from the IF signal; a speed detection unit configured to detect a speed of the target based on a plurality of the IF signals; and a target determination unit configured to identify a type of the target by using detection results from the displacement detection unit and detection results from the speed detection unit, or detection results from the displacement detection unit, environmental information defined at each position, and detection results from the position detection unit.

According to another embodiment of the present invention, an object detection method for an object detection device including a receiver, the method includes: receiving an RF reception signal that is a reflection of an RF transmission signal reflected from at least one target, the RF transmission signal having a frequency that is periodically swept; generating an IF signal by mixing the RF transmission signal with the RF reception signal; detecting a position of the target based on an amplitude in a one-dimensional spectrum computed from the IF signal having a frequency that is periodically swept; detecting a displacement of the target based on a phase in a one-dimensional spectrum computed from the IF signal, the phase in the one-dimensional spectrum being the phase at the detected position of the target; detecting a speed of the target based on a plurality of the IF signals; and identifying a type of the target by using the displacement detection results and the speed detection results, or the displacement detection results, environmental information defined at each position, and the position detection results.

According to another embodiment of the present invention, an object detection method for an object detection device including a receiver, the method includes: receiving an RF reception signal that is a reflection of an RF transmission signal reflected from at least one target, the RF transmission signal having a frequency that is periodically swept; generating an IF signal by mixing the RF transmission signal with the RF reception signal; detecting a position of the target based on an amplitude in a two-dimensional spectrum computed from the IF signal having a frequency that is periodically swept; computing a one-dimensional spectrum from the IF signal; detecting a displacement of the target based on a phase in the one-dimensional spectrum at the position of the target detected from the two-dimensional spectrum; detecting a speed of the target based on a plurality of the IF signals; and identifying a type of the target by using the displacement detection results and the speed detection results, or the displacement detection results, environmental information defined at each position, and the position detection results.

According to another embodiment of the present invention, an in-vehicle radar system includes: the above-mentioned object detection device; and a control device; wherein the object detection device is configured to output, to the control device, the position of the target detected by the position detection unit and the displacement of the target detected by the displacement detection unit; and the control device is configured to control at least one of an engine power output and brakes based on the position of the target and the displacement of the target.

According to another embodiment of the present invention, a monitoring radar system includes: the above-mentioned object detection device; and a warning device; wherein the object detection device is configured to output, to the warning device, the displacement of the target detected by the displacement detection unit; and the warning device is configured to output an alarm based on the displacement.

According to another embodiment of the present invention, a program makes a computer in an object detection device including a receiver execute processes, the processes include: emitting an RF transmission signal having a frequency that is periodically swept; receiving an RF reception signal that is a reflection of the RF transmission signal reflected from at least one target, the RF transmission signal having a frequency that is periodically swept;

generating an IF signal by mixing the RF transmission signal with the RF reception signal; detecting a position of the target based on an amplitude in a one-dimensional spectrum computed from the IF signal having a frequency that is periodically swept; detecting a displacement of the target based on a phase in the one-dimensional spectrum at the detected position of the target; detecting a speed of the target based on a plurality of the IF signals; and identifying a type of the target by using the displacement detection results and the speed detection results, or the displacement detection results, environmental information defined at each position, and the position detection results.

According to another embodiment of the present invention, a program makes a computer in an object detection device including a receiver execute processes, the processes includes: receiving an RF reception signal that is a reflection of an RF transmission signal reflected from at least one target, the RF transmission signal having a frequency that is periodically swept; generating an IF signal by mixing the RF transmission signal with the RF reception signal; detecting a position of the target based on an amplitude in a two-dimensional spectrum computed from the IF signal having a frequency that is periodically swept; computing a one-dimensional spectrum from the IF signal; detecting a displacement of the target based on a phase in the one-dimensional spectrum at the position of the target detected from the two-dimensional spectrum; detecting a speed of the target based on a plurality of the IF signals; and identifying a type of the target by using the displacement detection results and the speed detection results, or the displacement detection results, environmental information defined at each position, and the position detection results.

Advantageous Effects of Invention

According to the present invention, it is possible to detect moving bodies without using complicated processes or special equipment.

BRIEF DESCRIPTION OF DRAWINGS

FIG. 20 is a diagram showing the positional relationship between objects and a radar, and the horizontal beam width of the radar, in the actual measurement example using the object detection device according to the fourth embodiment of the present invention.

DESCRIPTION OF EMBODIMENTS

First Embodiment

Figure 1:
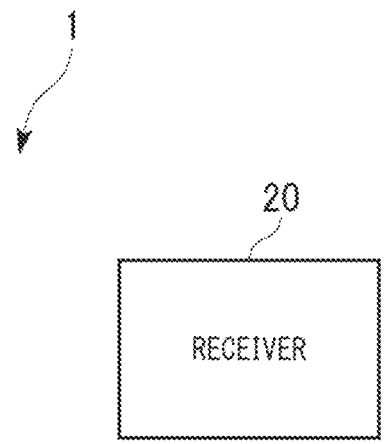
FIG. 1 is a diagram illustrating the minimum structure of an object detection device according to a first embodiment of the present invention.

Hereinbelow, embodiments will be explained in detail while referring to the drawings.

The structure of the object detection device according to the first embodiment of the present invention will be explained.

The object detection device according to the first embodiment of the present invention is the object detection device having the minimum structure.

The object detection device 1 according to the first embodiment of the present invention, as illustrated in FIG. 1, comprises a receiver 20.

Figure 2:
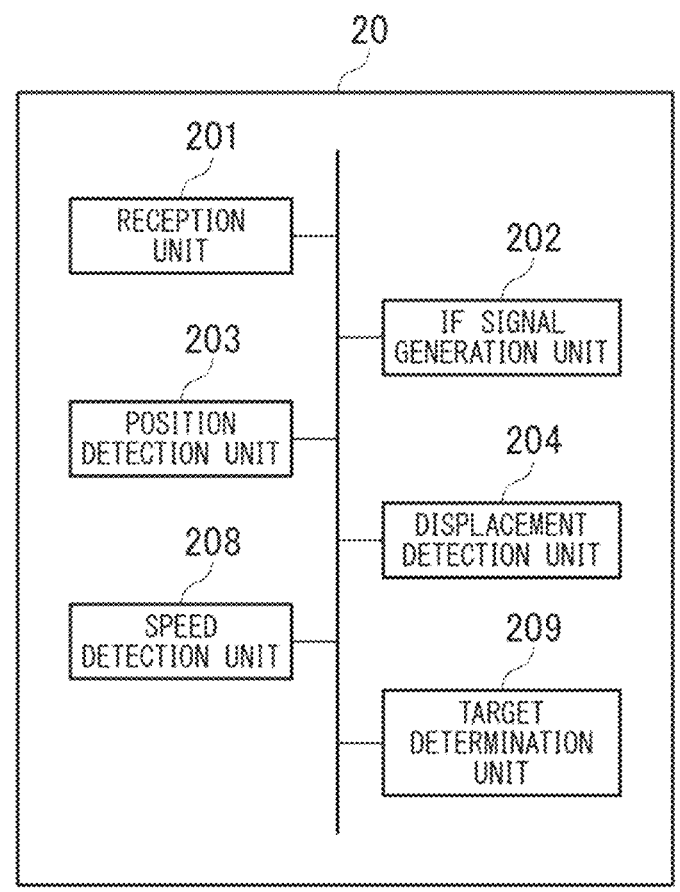
FIG. 2 is a diagram illustrating the structure of a receiver according to the first embodiment of the present invention.

The receiver 20, as illustrated in FIG. 2, comprises a reception unit 201, an IF signal generation unit 202, a position detection unit 203, a displacement detection unit 204, a speed detection unit 208 and a target determination unit 209.

The reception unit 201 receives an RF reception signal which is a reflection of an RF transmission signal reflected by at least one target. The RF transmission signal is a signal in which the frequency is periodically swept.

The IF signal generation unit 202 generates an IF signal by mixing the RF transmission signal with the RF reception signal.

The position detection unit 203 detects the position of a target (the distance between the target and the object detection device 1) based on the amplitude of a spectrum computed from the IF signal in each frequency sweep period. Specifically, for example, the position detection unit 203 detects the position of a target based on the amplitude of a one-dimensional spectrum computed from the IF signal in each frequency sweep period.

The displacement detection unit 204 detects the displacement of the target based on the phase of the one-dimensional spectrum at the position of the target detected by the position detection unit 203, the phase of the spectrum being computed from the IF signal in each frequency sweep period.

The speed detection unit 208 detects the speed of the target based on multiple IF signals that are successively obtained by periodically sweeping the frequency. Specifically, for example, the speed detection unit 208 detects the speed of the target based on a two-dimensional spectrum generated based on multiple one-dimensional spectra computed from the multiple IF signals.

The target determination unit 209 identifies the type of the target by using the detection results from the displacement detection unit 204 and the detection results from the speed detection unit 208, or the detection results from the displacement detection unit 204, environmental information defined for each position, and the detection results from the position detection unit 203. The environmental information that is defined for each position is information indicating conditions that are specific to that position, for example, that a person will not be present in an area on a rooftop separated from the floor, or that an automobile will not move in the wrong direction on a one-way street. However, the information indicating conditions specific to that position includes information indicating that there are no limitations at that position. The environmental information that is defined for each position is stored in a storage unit and is read from the storage unit as needed. In the description hereinbelow, even when it is not particularly stated that the environmental information is read from the storage unit, it is actually processed after being read out.

By using such a structure, when the frequency sweep period is longer (in other words, when the measurement time is longer) than the period of fluctuations that can be expected in the target, the object detection device 1 detects the position of the target by means of the reception unit 201, the IF signal generation unit 202, the position detection unit 203 and the displacement detection unit 204, and at the detected target position, detects the displacement of the target over time, thereby allowing targets with displacement trends (displacement change patterns, magnitudes, frequencies and the like) to be identified as moving bodies. The fluctuations mentioned here refer to changes in the displacement of a target over time. Additionally, as a specific example of a displacement pattern, if the displacement increases in the positive direction (i.e., in the direction from the transmitter towards the target) over time, the target determination unit 209 of the object detection device 1 can determine that the target is moving in a direction away from the transmitter, so the target movement direction can be determined. As a specific example of the displacement magnitude, the displacement of a person who is waving a hand will be greater than the displacement of a person who is motionless. Thus, the target determination unit 209 in the object detection device 1 can identify whether each person is motionless or moving based on the differences in displacement magnitude. Additionally, the target determination unit 209 can distinguish between pedestrians (i.e., moving people) and people who are waving their hands. In a pedestrian, there is considerable variation in the displacement of the arms and feet. On the other hand, in a person waving a hand, the arm is moving, but the feet are mostly unmoving. For this reason, the variation in the displacement of a person waving a hand is lower than the variation in the displacement of a pedestrian. The target determination unit 209 is able to identify pedestrians and people waving their hands based on such tendencies. The identification performed by the target determination unit 209 is not limited to the identification of pedestrians and people waving their hands, and may be implemented as in the above-described example of identifying pedestrians and people waving their hands, based on the displacement variation characteristics of each target. Specifically, for example, experiments, simulations and the like are performed for each target, and the variations in the displacement of each target are pre-stored in a storage unit. The target determination unit 209 compares the variation in the displacement of the target obtained by actual measurement with the variation in the displacement of each target stored in the storage unit, then identifies the target that is being measured as being a target, in the storage unit, having displacement variations that are within the range of error and that can be considered to be identical.

Additionally, as a specific example of the frequency of the displacement, the frequency of an automobile that is motionless but has a running engine will be higher than the frequency of a motionless person. Thus, the target determination unit 209 in the object detection device 1 is able to identify automobiles and people.

Additionally, when the frequency sweep period is shorter than the period of fluctuations expected in the target, the object detection device 1 detects the position of the target and detects the displacement of the target at the detected target position by means of the reception unit 201, the IF signal generation unit 202, the position detection unit 203 and the displacement detection unit 204, and can determine whether or not there are fluctuations in the target. Additionally, the object detection device 1 can identify the speed of a target by means of the speed detection unit 208. Therefore, by combining the presence or absence of fluctuations in the target with the speed of the target, the object detection device 1 can identify mobile objects (i.e., moving bodies), motionless people and motionless objects. Mobile objects include moving people and things other than moving people.

The object detection device 1 can further determine the physical type of an object by using environmental information that is defined at each position based on the target position detected by the position detection unit 203. For example, when it is not clear whether a target that is moving at a speed of 5 km per hour on a one-way street is an automobile or a person, if the target is moving in the direction opposite to the traffic direction on the one-way street, then the target can be identified as not being an automobile, i.e., being a person.

As a result thereof, the object detection device 1 can detect a moving body without using complicated processes or special equipment.

In the embodiments of the present invention indicated below, the object detection device 1 will be explained in further detail, and the effects of the above-mentioned object detection device 1 will become clearer.

Second Embodiment

The structure of the object detection device according to the second embodiment of the present invention will be explained.

Figure 3:
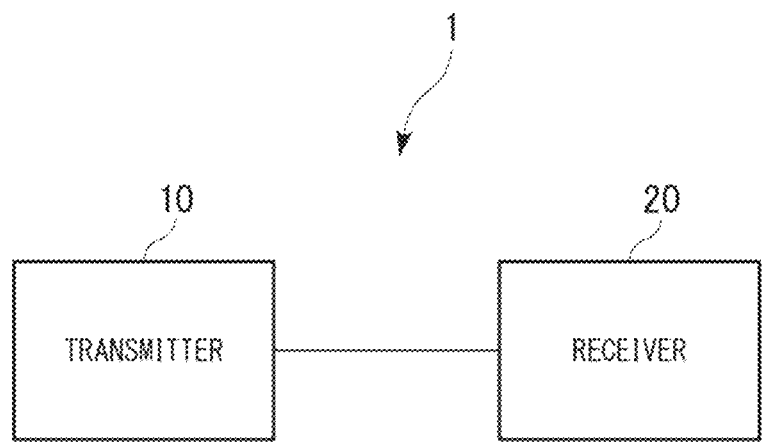
FIG. 3 is a diagram illustrating the structure of an object detection device according to a second embodiment of the present invention.

The object detection device 1 according to the second embodiment of the present invention, as illustrated in FIG. 3, comprises a transmitter 10 and a receiver 20.

Figure 10:
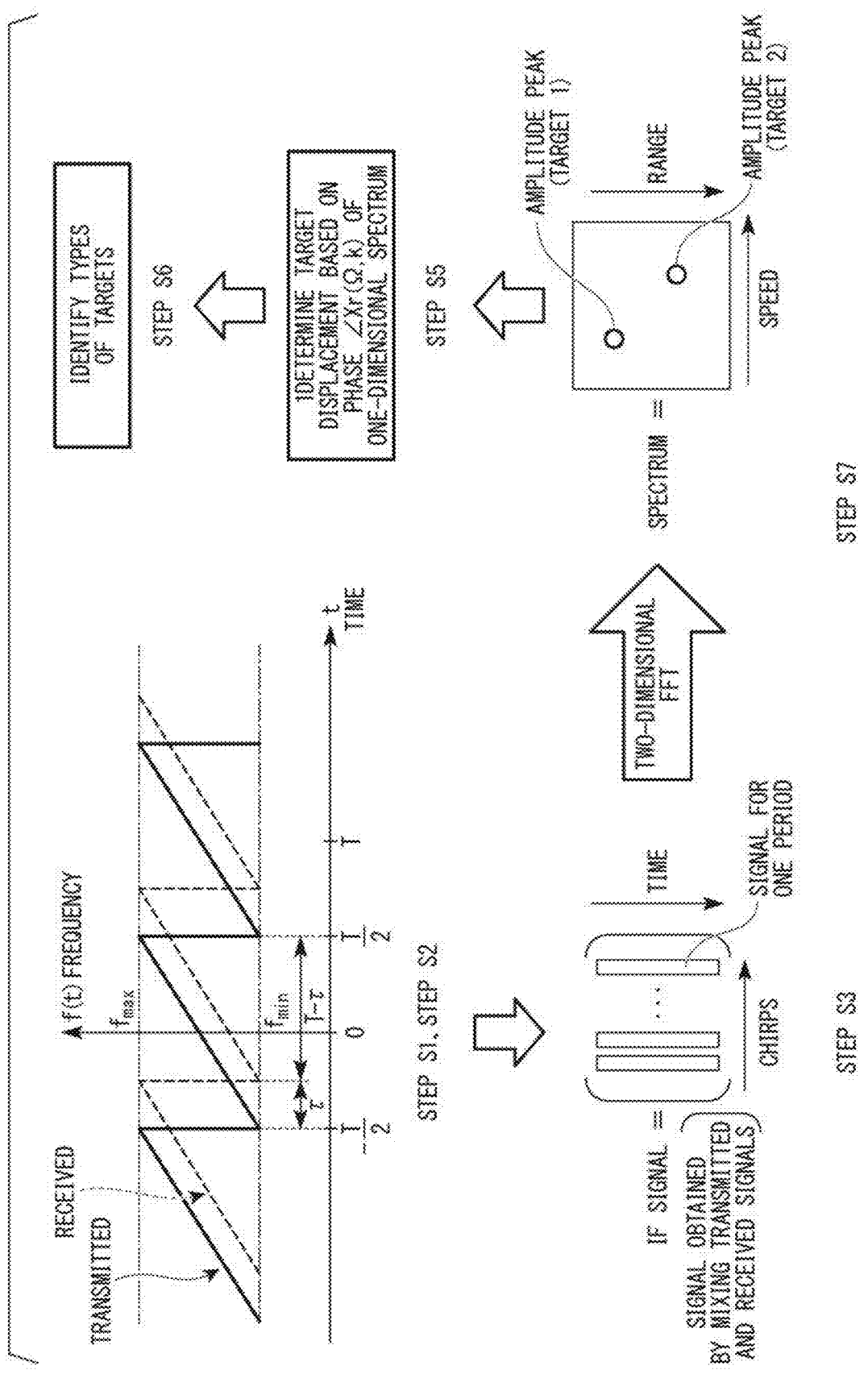
FIG. 10 is an image diagram showing the processing in the object detection device according to the third embodiment of the present invention.

The transmitter 10, as illustrated in FIG. 10, comprises an irradiation unit 101, a control unit 102 and a storage unit 103.

The irradiation unit 101 irradiates the target with an RF transmission signal having a frequency that is periodically swept.

The control unit 102 implements control that is necessary for various processes performed by the transmitter 10.

The storage unit 103 stores various types of information that are necessary for the processes performed by the transmitter 10.

Figure 5:
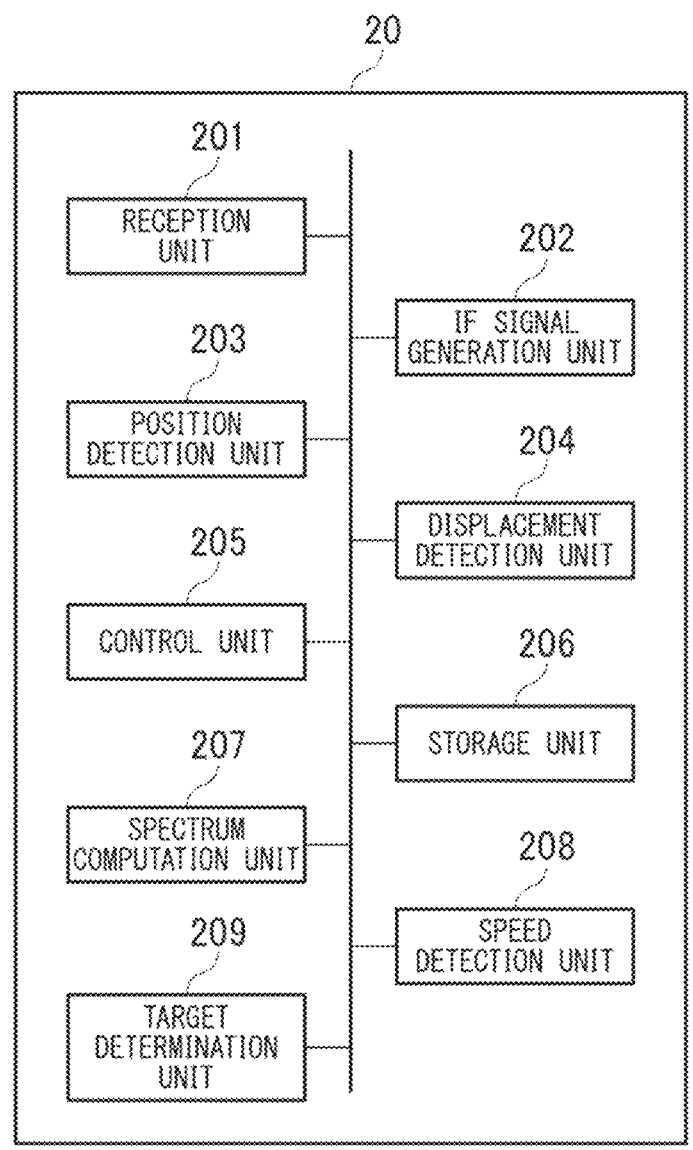
FIG. 5 is a diagram illustrating the structure of a receiver according to the second embodiment of the present invention.

The receiver 20, as illustrated in FIG. 5, comprises a reception unit 201, an IF signal generation unit 202, a position detection unit 203, a displacement detection unit 204, a control unit 205, a storage unit 206, a spectrum computation unit 207 (example of first spectrum computation unit and second spectrum computation unit), a speed detection unit 208 and a target determination unit 209.

The reception unit 201 receives an RF reception signal that is a reflection of the RF transmission signal by which the irradiation unit 101 irradiates the target.

The IF signal generation unit 202 generates an IF signal by mixing the RF transmission signal with the RF reception signal.

The position detection unit 203 detects the position R(t) of a target (the distance between the target and the object detection device 1) based on the position of an amplitude peak in a one-dimensional spectrum computed from the IF signal in each period.

For example, the position detection unit 203 detects the position of an amplitude peak in the one-dimensional spectrum $X_r(\omega, k)$ indicated by Expression (14) indicated below as the target position (the distance between the target and the object detection device 1) $R_0$ at a reference time (t=0).

The displacement detection unit 204 detects displacement of the target based on the phase of the one-dimensional spectrum at the target position $R_0$ detected by the position detection unit 203.

The control unit 205 implements the control necessary for various processes performed by the receiver 20.

The storage unit 206 stores various types of information necessary for the processes performed by the receiver 20.

The spectrum computation unit 207 computes a one-dimensional spectrum $X_r(\omega, k)$ of the IF signal by applying a one-dimensional Fourier transform to the IF signal in each period. When the frequency sweep period is longer than the period of fluctuations expected in the target, the spectrum computation unit 207 computes a two-dimensional spectrum $X(\omega, \psi)$ of the IF signal x(t) by applying a two-dimensional Fourier transform in each period.

The speed detection unit 208 detects the speed of the target based on multiple IF signals that are successively obtained, each in a frequency sweep period. Specifically, the speed detection unit 208 detects the speed of the target by detecting a peak in a two-dimensional spectrum $X(\omega, \psi)$ that is computed by the spectrum computation unit 207 using the target position $R_0$ detected by the position detection unit 203 based on the IF signal in each period.

The target determination unit 209 identifies the types of the target by using the detection results from the displacement detection unit 204 and the detection results from the speed detection unit 208, or the detection results from the displacement detection unit 204, environmental information defined for each position, and the detection results from the position detection unit 203.

The processing in the object detection device according to the second embodiment of the present invention will be explained.

In this case, the processing flow in the object detection device 1 according to the second embodiment of the present invention shown in FIG. 6 will be explained.

Figure 6:
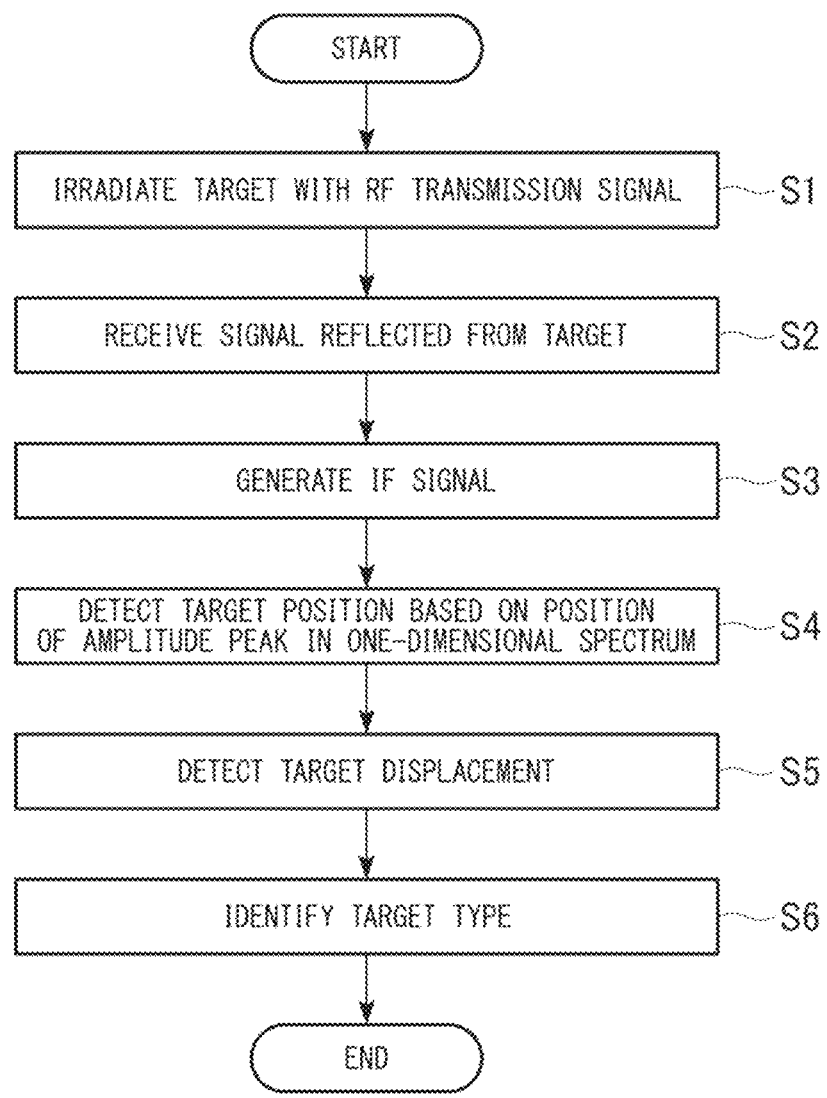
FIG. 6 is a diagram showing the processing flow in the object detection device according to the second embodiment of the present invention.

The processing flow in the object detection device 1 according to the second embodiment of the present invention shown in FIG. 6 is the processing flow for the case in which there is little noise in the environment in which the object is being detected and the frequency sweep period is longer than the period of fluctuations that are expected in the target.

When there is little noise in the environment in which the object is being detected and the frequency sweep period is longer than the period of fluctuations that are expected in the target, there is little noise, so the movement of the target can be detected from displacement tendencies computed during measurement by the object detection device 1. For this reason, in this case, there is no need for the spectrum computation unit 207 to actually apply a two-dimensional Fourier transform in each period to compute the two-dimensional spectrum X (ω, ψ) of the IF signal x(t). Therefore, the speed detection unit 208 does not need to detect the speed of the target based on multiple IF signals that are successively obtained, each in a frequency sweep period.

The irradiation unit 101 irradiates the target with a frequency-sweeping RF transmission signal (step S1).

For example, the RF transmission signal u(t) is a signal represented by the following Expression (1).

$$u(t)=U\cos[\theta(t)] \tag{1}$$

The symbol t represents time. The symbol U represents the amplitude of the RF transmission signal u(t). The symbol θ represents the phase. The phase θ is expressed as a function of the time t.

The RF transmission signal with which the target is irradiated is reflected by the target. A signal that has been reflected by the target returns to the object detection device 1.

The reception unit 201 receives the signal reflected by the target (step S2). Hereinbelow, the signal received by the reception unit 201, in other words, the signal reflected by the target, will be referred to as the RF reception signal.

For example, the RF reception signal is a signal expressed by the following Expression (2).

$$u_0(t)=U_0\cos[\theta_0(t)] \tag{2}$$

The symbol $U_0$ represents the amplitude of the RF reception signal $u_0(t)$. The symbol $\theta_0(t)$ represents the phase.

The phase $\theta_0(t)$ is expressed as a function of the time t.

The reception unit 201 transmits the received RF reception signal $u_0(t)$ to the IF signal generation unit 202.

The IF signal generation unit 202 acquires the RF transmission signal u(t) from the irradiation unit 101.

Additionally, the IF signal generation unit 202 acquires the RF reception signal $u_0(t)$ from the reception unit 201.

Figure 7:
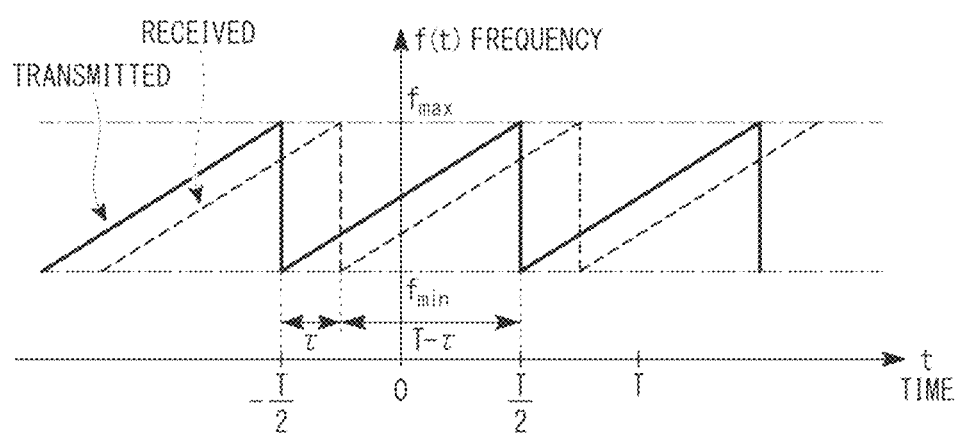
FIG. 7 is a diagram showing a chirp signal according to the second embodiment of the present invention.

The RF transmission signal u(t) acquired by the IF signal generation unit 202 is, for example, the chirp signal shown in FIG. 7. The frequency f(t) of the chirp signal changes as indicated by the next Expression (3).

$$f(t)=f_{min}+\alpha(t-kT) \tag{3}$$

The time t has a value within the range (kT−T/2)<t<(kT+T/2). The symbol k represents an integer such as 0, ±1, ±2 and so on. The symbol T represents one period of the chirp signal. The symbol $f_{min}$ represents the lowest frequency of the chirp signal. The symbol α represents the rate of change (slope) per unit time of the frequency f(t).

When the frequency f(t) of the RF transmission signal u(t) changes as shown in Expression (3), the relationship indicated by the following Expression (4) is established between the frequency f(t) and the phase θ(t).

$$f(t)=(1/(2\pi))\times(d\theta(t)/dt) \tag{4}$$

From Expression (3) and Expression (4), the phase θ(t) can be calculated as indicated by the following Expression (5).

$$\theta(t_k)=2\pi f_{min}t_k+\pi\alpha t_k^2 \tag{5}$$

In this case, $t_k=t-kT$ and $t-kT$ is replaced with $t_k$.

If the RF reception signal $u_0(t)$ acquired by the IF signal generation unit 202 is, for example, the chirp signal shown in FIG. 7, a time lag τ arises between the RF transmission signal u(t) and the RF reception signal $u_0(t)$.

At this time, the phase relationship indicated by the following Expression (6) is established.

$$\theta_0(t)=\theta(t-\tau) \tag{6}$$

$R(t)=R_0+vt$ and $\tau_0=2R_0/c$, so the time lag τ can be isolated as indicated by the following Expression (7).

$$\tau=2R(t)/c=\tau_0+2vt/c \tag{7}$$

In Expression (7), the symbol $\tau_0$ represents the time lag of the RF reception signal $u_0(0)$ with respect to the RF transmission signal u(0) output at the reference time t=0. The symbol v represents the speed of movement of the target. The symbol c represents the speed of light.

The term 2vt/c, which is the second term on the right side in Expression (7), indicates the change in the time lag of the RF reception signal $u_0(t)$ with respect to the RF transmission signal u(t) when the target is moving at the speed v.

The relationship indicated by the following Expression (8) is established between the time lag $\tau_0$ and the target position $R_0$ at the time t=0.

$$\tau_0=2R_0/c \tag{8}$$

The IF signal generation unit 202 generates an IF signal by mixing the acquired RF transmission signal u(t) with the acquired RF reception signal $u_0(t)$ (step S3).

Specifically, the IF signal generation unit 202, for example, generates the IF signal x(t) indicated by the following Expression (9).

$$x(t)=\cos[\theta_w(t)] \tag{9}$$

The phase $\theta_w(t)$ of the IF signal x(t) is the phase indicated by the following Expression (10).

$$\theta_w(t)=\theta(t)-\theta_0(t)=2\pi f_{min}\tau-\pi\alpha(\tau^2-2t_k\tau) \tag{10}$$

In Expression (10), the time $t_k$ has a value within the range from (−T/2+τ) to (T/2).

When the target position R(t) (the distance from the object detection device 1 to the target) is 60 meters, the time lag τ=0.4 μs. Additionally, a representative value for the time $t_k$ is the chirp period T (approximately 100 μs). Therefore, comparing the time lag τ with the time $t_k$ in Expression (10), the time lag τ is much shorter than the time $t_k$.

Therefore, applying the condition that time lag τ<<time $t_k$ in Expression (10), it is possible to use an approximation in which the $τ^2$ term is ignored.

Due to this approximation, the phase $θ_w(t)$ of the IF signal x(t) is expressed by the following Expression (11).

$$θ_w(t)=2π[f_{min}τ_0+kf_dT+(f_w+f_d)t_k] \quad (11)$$

In Expression (11), the symbol $f_d$ represents the Doppler frequency. The symbol $f_w$ represents the frequency shift caused by the time lag $τ_0$ at the target position $R_0$.

The Doppler frequency $f_d$ can be represented by the following Expression (12).

$$f_d=2vf_{min}/c \quad (12)$$

The frequency shift $f_w$ can be represented by the following Expression (13).

$$f_w=ατ_0 \quad (13)$$

The spectrum computation unit 207 applies a one-dimensional Fourier transform to the IF signal x(t) over a period T of the chirp signal. The one-dimensional spectrum (complex spectrum) $X_r(ω, k)$ computed by the spectrum computation unit 207 can be represented by the following Expression (14).

$$X_r(ω, k) ≈ \int_{-T/2}^{T/2} x(t_k)\exp(-jωt_k)dt_k = \frac{2\exp[j2π(f_{min}τ_0 + kf_dT)]}{2π(f_w + f_d) - ω}\sin\left[\{2π(f_w + f_d) - ω\}\frac{T}{2}\right] \quad (14)$$

The lower limit of the integration range in Expression (14) is actually (−T/2)+τ, but the lower limit of the integration range is approximated as (−T/2) because the period T>>time lag τ.

The position detection unit 203 detects the target position R(t) based on the position of an amplitude peak in the one-dimensional spectrum $X_r(ω, k)$ computed from the IF signal x(t) in each period by the spectrum computation unit 207 (step S4).

For example, the position detection unit 203 detects the position of the amplitude peak in the one-dimensional spectrum $X_r(ω, k)$ indicated by Expression (14) as the target position R(t).

When the number of chirps is K, the phase $∠X_r(ω, k)$ of the one-dimensional spectrum $X_r(ω, k)$ indicated by Expression (14) can be represented by the following Expression (15).

$$∠X_r(ω, k) = 2π(f_{min}τ_0 + kf_dT) = \frac{4π}{λ}(R_0 + vkT) ≡ \frac{4π}{λ}R(t) \quad (15)$$

In Expression (15), the symbol k represents an integer in the range 0, 1, 2, . . . , K. The symbol a(kT) represents the displacement (fluctuations/vibrations) from the initial position $R_0$. The symbol R(kT) represents the target position (the distance between the target and the object detection device 1) measured in each period T of the chirp signal.

The displacement detection unit 204 detects the target displacement a(kT) based on the phase $∠X_r(ω, k)$ of the one-dimensional spectrum at the position $R_0$ of the target detected by the position detection unit 203 (step S5). The displacement detection unit 204 outputs the detected target displacement a(kT) to the target determination unit 209.

The target determination unit 209 identifies the type of the target by using the target displacement a(kT) received from the displacement detection unit 204, environmental information defined for each position, and the target position received from the position detection unit 203 (step S6).

Specifically, for example, the target determination unit 209 determines whether the target is a mobile object or a motionless object. In other words, when determining the state of the target, if the target displacement a(kT) varies by more than a prescribed threshold value, then it is determined that the target is a mobile object (i.e., a moving body).

Additionally, if the target displacement a(kT) is the prescribed threshold value or less, then the target determination unit 209 determines that the target is a motionless object or a motionless person.

Additionally, for example, the case in which the target determination unit 209 has determined that the target is a mobile object, it is defined in the environmental information that the position at which the target is located is a one-way street, and the physical type is identified from among automobiles and people will be explained. In this case, when the trend in the change in the target displacement a(kT) indicates movement in the direction opposite to the direction in which one-way traffic is allowed, the target determination unit 209 excludes, from the possible targets, mobile objects that are prohibited from traveling in the opposite direction, such as automobiles and motorcycles. As a result thereof, the target determination unit 209 identifies the physical type of the target as that of a person.

From Expression (15), it is possible to represent the target position R(t) as in the following Expression (16).

$$R(kT)=(R_0+a(kT)) \quad (16)$$

The target range R(t), which is determined by the phase $∠X_r(ω, k)$ of the one-dimensional spectrum, has the two properties (a) and (b) indicated below.

(a) It is not possible to obtain the absolute value of the target range R(t) determined by the phase $∠X_r(ω, k)$ of the one-dimensional spectrum.

(b) The resolution of the displacement obtained by the change over time in the target range R(t) is not limited by the range resolution c/(2BW) due to the one-dimensional Fourier transform that was applied when computing the one-dimensional spectrum $X_r(ω, k)$.

The property (a) of the target range R(t) will be explained.

The phase $∠X_r(ω, k)$ of the one-dimensional spectrum is treated in the same way whether or not an unspecified constant (a phase that is an integer multiple of 2n) is added. For this reason, even if an unspecified constant is added to the right side of the phase $∠X_r(ω, k)$ of the one-dimensional spectrum represented by Expression (15), it is not possible to determine whether or not the unspecified constant has been added on the basis of the measurement value of the phase $∠X_r(ω, k)$.

Therefore, the displacement detection unit 204 cannot determine the absolute value of the range R(t) represented by Expression (16) determined by the phase $∠X_r(ω, k)$ of the one-dimensional spectrum.

However, the displacement detection unit 204 can correctly determine the target displacement (fluctuations/vibrations) a(kT), which is the change over time of the range R(t) from which the unspecified constant has been subtracted. In other words, the displacement detection unit 204 can determine whether or not target displacement has been detected in accordance with whether or not there is a change over time in the target range R(t) in each period of the IF signal x(t) indicated by the phase of the one-dimensional spectrum.

The displacement detection unit 204 determines that displacement of the target is detected when there is a change over time in the target range R(t) in each period of the IF signal x(t) indicated by the phase of the one-dimensional spectrum. Additionally, when there is no change over time in the target range R(t) in each period of the IF signal x(t) indicated by the phase of the one-dimensional spectrum, the displacement detection unit 204 determines that displacement of the target is not detected.

In other words, the displacement detection unit 204 detects whether or not there is target displacement on the basis of the phase of the one-dimensional spectrum in the IF signal x(t) obtained in each period of the chirp signal.

The property (b) of the target range R(t) will be explained.

When identifying the range R(t) on the basis of the phase $\angle X_r(\omega, k)$ of the one-dimensional spectrum, the resolution of the range R(t) is limited not by the range resolution c/(2BW) due to the one-dimensional Fourier transform that was applied when computing the one-dimensional spectrum $X_r(\omega, k)$, but rather by the phase error.

The phase $\angle X_r(\omega, k)$ of the one-dimensional spectrum when including the phase error can be represented by the following Expression (17).

$$\angle X_r(\omega, k) = \frac{4\pi}{\lambda} R(t) + \Delta\theta = \frac{4\pi}{\lambda}\left[R(t) + \frac{\lambda}{4\pi}\Delta\theta\right] \quad (17)$$

In Expression (17), the symbol $\Delta\theta$ represents the phase error.

As can be understood from Expression (17), the error $\Delta R$ in the range due to the phase error $\Delta\theta$ can be represented by the following Expression (18).

$$\Delta R = (\lambda/4\pi) \times \Delta\theta \quad (18)$$

In Expression (18), the symbol $\lambda$, represents the wavelength corresponding to $f_{min}$. For example, if the wavelength $\lambda$, is 4 mm ($f_{min}$=75 GHz) and the phase error $\Delta\theta$ is 3°, then the range error $\Delta R$ is 17 µm according to Expression (18).

In other words, the position detection unit 203 can determine the target displacement at a high resolution based on the phase $\angle X_r(\omega, k)$ of the one-dimensional spectrum.

The target displacement determined by the position detection unit 203 occurs in the range R(t) direction (the direction from the object detection device 1 towards the target or the direction from the target towards the object detection device 1). The position detection unit 203 does not determine the target displacement in angled directions (directions other than the direction of the range R(t)).

Figure 8:
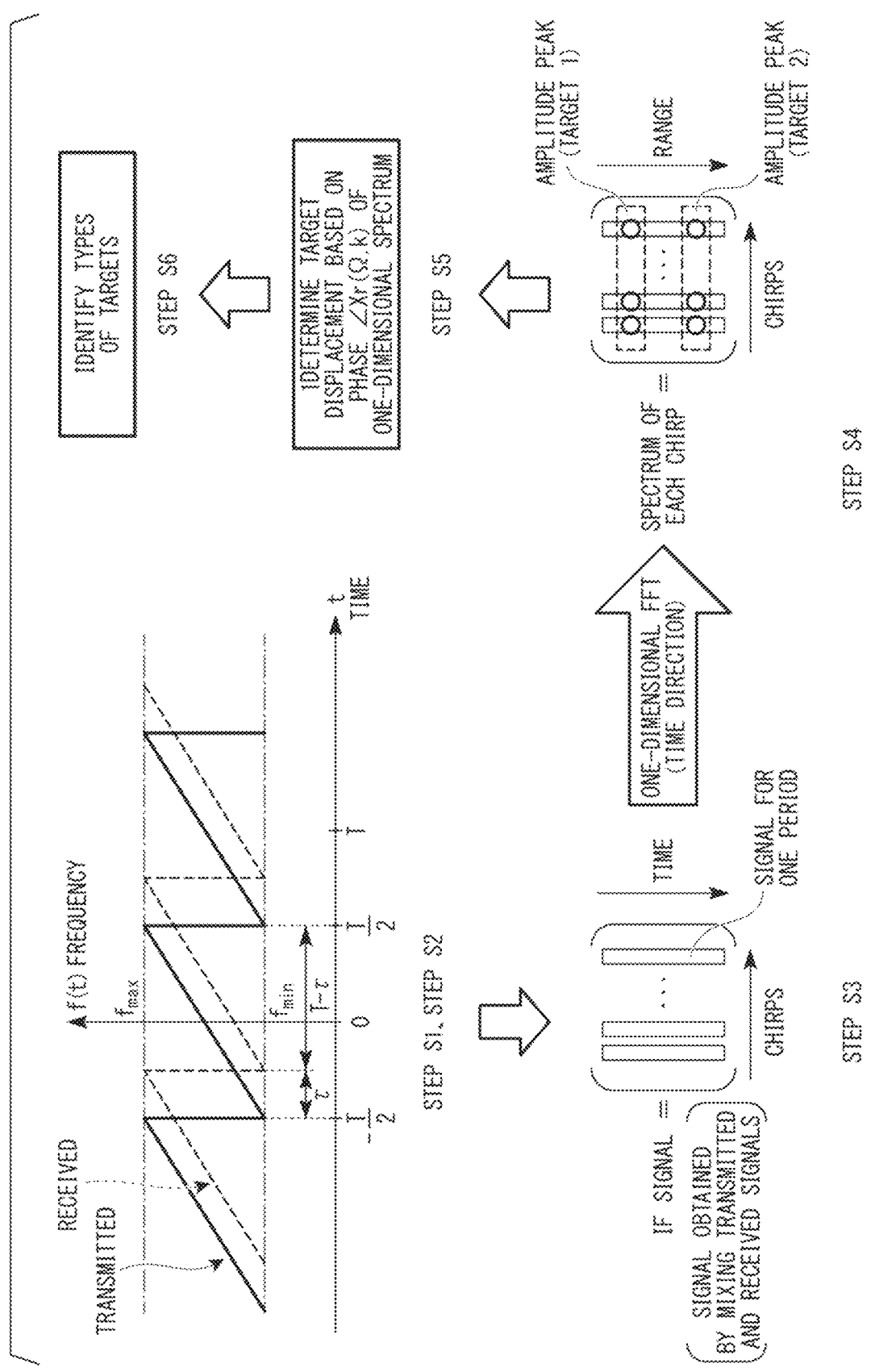
FIG. 8 is an image diagram showing the processing in the object detection device according to the second embodiment of the present invention.

The processing in the object detection device 1 according to the second embodiment of the present invention described above can be summarized as represented by the image diagram shown in FIG. 8.

By the processes in step S1 and step S2, the object detection device 1 irradiates targets with a frequency-sweeping RF transmission signal u(t) and receives a reception signal $u_0(t)$ reflected by the targets.

By the process in step S3, the object detection device 1 generates an IF signal by mixing the RF transmission signal u(t) with the reception signal $u_0(t)$.

By the process in step S4, the object detection device 1 determines the positions of amplitude peaks in the one-dimensional spectrum $X_r(\omega, k)$ obtained by applying a one-dimensional Fourier transform to the IF signal x(t) as the positions $R_0$ of targets. By the process in this step S4, the target detection device 1 determines the positions of the targets at a positional resolution of approximately 30 cm. The positions $R_0$ of the targets are obtained for each period of the chirp signal, i.e. for a one-dimensional spectrum in each period.

By the process in step S5, the object detection device 1 determines the displacement of the targets based on the phase $\angle X_r(\omega, k)$ of the one-dimensional spectrum at the positions $R_0$ of the targets. By the process in step S6, the object detection device 1 identifies the types of the targets.

Each functional unit may store the expressions necessary for processing. Alternatively, storage units may store the expressions, and the functional units may read the necessary expressions from the storage units.

The object detection device 1 according to the second embodiment of the present invention has been explained above. In the object detection device 1 according to the second embodiment of the present invention, when there is little noise in the environment in which the object is being detected and the frequency sweep period is longer than the period of fluctuations that are expected in the target, the spectrum computation unit 207 applies a one-dimensional Fourier transform in each period to compute a one-dimensional spectrum $X_r(\omega, k)$ of the IF signal x(t). The position detection unit 203 detects the target position $R_0$ based on the position of an amplitude peak in the one-dimensional spectrum $X_r(\omega, k)$ computed from the IF signal x(t) in each period. The displacement detection unit 204 determines the range R(t) based on the phase $\angle X_r(\omega, k)$ of the one-dimensional spectrum $X_r(\omega, k)$ at the target position $R_0$ detected by the position detection unit 203. The displacement detection unit 204 detects the target displacement (fluctuations/vibrations), which is the change over time in the range R(t), from which an unspecified constant has been subtracted. The target determination unit 209 receives the target displacement a(kT) from the displacement detection unit 204. The target determination unit 209 determines the type of target state of the target based on the displacement in the target displacement a(kT) received from the displacement detection unit 204.

If the target displacement a(kT) varies in excess of a prescribed threshold value, then the target determination unit 209 determines that the target is a mobile object. If the target displacement a(kT) is a threshold value or less, then the target determination unit 209 determines that the target is a motionless object or a motionless person.

In this manner, the object detection device 1 can detect moving bodies without using complicated processes or special equipment.

Additionally, when there is environmental information defined for each position, the target determination unit 209 identifies the physical type of the target by using the target displacement a(kT) received from the displacement detection unit 204, the environmental information that is defined at each position, and the target position received from the position detection unit 203.

In this manner, the object detection device 1 can further identify the physical type of the target without using complicated processes or special equipment.

Third Embodiment

The structure of the object detection device according to the third embodiment of the present invention will be explained.

The object detection device 1 according to the third embodiment of the present invention comprises a transmitter 10 and a receiver 20, as in the object detection device 1 according to the second embodiment of the present invention.

Figure 4:
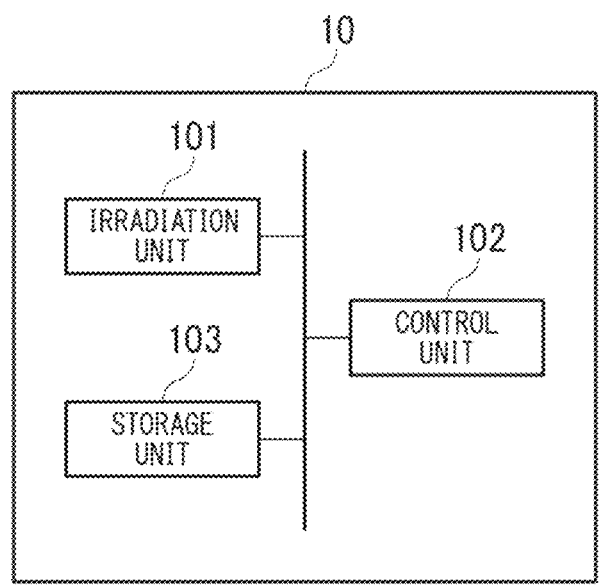
FIG. 4 is a diagram illustrating the structure of a transmitter according to the second embodiment of the present invention.

As in the transmitter 10 according to the second embodiment illustrated in FIG. 4, the transmitter 10 comprises an irradiation unit 101, a control unit 102 and a storage unit 103.

As in the receiver 20 in the second embodiment illustrated in FIG. 5, the receiver 20 comprises a reception unit 201, an IF signal generation unit 202, a position detection unit 203, a displacement detection unit 204, a control unit 205, a storage unit 206, a spectrum computation unit 207, a speed detection unit 208 and a target determination unit 209.

The spectrum computation unit 207 computes a one-dimensional spectrum $X_r(\omega, k)$ of the IF signal x(t) by applying a one-dimensional Fourier transform in each period. The spectrum computation unit 207 computes a two-dimensional spectrum $X(\omega, \psi)$ of the IF signal x(t) by applying a two-dimensional Fourier transform in each period.

The position detection unit 203 detects the position $R_0(t)$ of a target based on the position of an amplitude peak in the two-dimensional spectrum computed from the IF signal in each period.

For example, the position detection unit 203 detects the position of an amplitude peak in the two-dimensional spectrum $X(\omega, \psi)$ computed by the spectrum computation unit 207 as the target position $R_0$.

The speed detection unit 208 detects the speed of the target based on multiple IF signals that are successively obtained, each in a frequency sweep period.

The target determination unit 209 identifies the type of the target by using the detection results from the displacement detection unit 204 and the detection results from the speed detection unit 208, or the detection results from the displacement detection unit 204, environmental information defined for each position, and the detection results from the position detection unit 203.

The processing in the object detection device according to the third embodiment of the present invention will be explained.

In this case, the processing flow in the object detection device 1 according to the third embodiment of the present invention shown in FIG. 9 will be explained.

Figure 9:
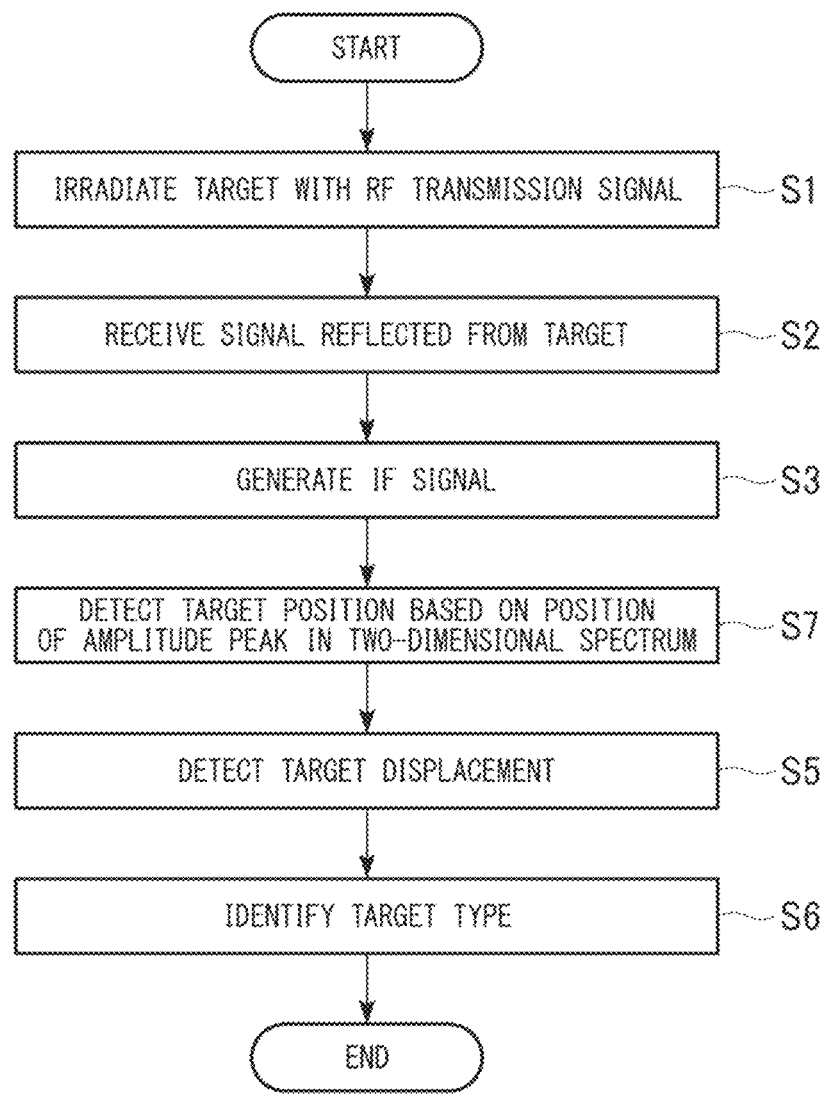
FIG. 9 is a diagram showing the processing flow in the object detection device according to the third embodiment of the present invention.

The processing flow in the object detection device 1 according to the third embodiment of the present invention shown in FIG. 9 is the processing flow for the case in which there is a lot of noise in the environment in which the object is being detected and the frequency sweep period is longer than the period of fluctuations that are expected in the target.

The object detection device 1 performs the processes in steps S1 to S3.

The position detection unit 203 detects the target position $R_0$ based on the position of an amplitude peak in a two-dimensional spectrum $X(\omega, \psi)$ computed by the spectrum computation unit 207 (step S7). The two-dimensional spectrum $X(\omega, \psi)$ is obtained by applying a two-dimensional Fourier transform to a matrix having multiple column vectors each representing an IF signal x(t) in a period of the chirp signal.

For example, the position detection unit 203 detects the position of the amplitude peak in the two-dimensional spectrum $X(\omega, \psi)$ indicated by the following Expression (19) as the target position $R_0$.

The SN ratio due to the method in which the position detection unit 203 detects the target position $R_0$ based on the position of the amplitude peak in the two-dimensional spectrum $X(\omega, \psi)$ is improved by $10 \log_{10}(K)$ decibels, where the symbol K represents the number of chirps, in comparison to the SN ratio due to the method in which the position detection unit 203 detects the target position $R_0$ based on the position of the amplitude peak in the one-dimensional spectrum $X_r(\theta, k)$.

$$X(\omega, \psi) = \sum_{k=0}^{K-1} X_r(\omega, k)\exp(-jk\psi) = \frac{2\exp(j2\pi f_{min}\tau_0)}{2\pi(f_w + f_d) - \omega} \cdot \frac{\exp[jK(2\pi f_d T - \psi)] - 1}{\exp[j(2\pi f_d T - \psi)] - 1} \quad (19)$$

In Expression (19), the symbol K represents the number of chirps. The two-dimensional spectrum $X(\omega, \psi)$ is a two-dimensional spectrum obtained by applying a two-dimensional Fourier transform to the IF signal x(t) for a period T of the chirp signal, and can be represented by using one-dimensional spectra $X_r(\omega, k)$.

When $\omega = 2\pi(f_w + f_d) \approx 2\pi f_w$ and $\psi = 2\pi f_d T$, at which values the denominator of the two-dimensional spectrum $X(\omega, \psi)$ becomes 0 (zero), there is a peak in the amplitude $|X(\omega, \psi)|$ of the two-dimensional Fourier transform.

Therefore, the frequencies $f_w(=\alpha R_0/c)$ and $f_d(=2vf_{min}/c)$ are determined by the peak in the amplitude $|X(\omega, \psi)|$ of the two-dimensional Fourier transform, and the position detection unit 203 can compute the position $R_0$ and the speed v of the target at the time t=0 on the basis of the frequency $f_w$ and $f_d$.

The factor $\omega$ in the two-dimensional spectrum $X(\omega, \psi)$ is proportional to the target position $R_0$, and the factor $\psi$ is proportional to the speed v. For this reason, it is possible to perform a scale conversion on the two-dimensional spectrum $X(\omega, \psi)$, and to replace the factors ($\omega$ and $\psi$) in the amplitude $|X(\omega, \psi)|$ of the two-dimensional Fourier transform with the position $R_0$ and the speed v of the target, thereby obtaining, for example, a two-dimensional plot having the position $R_0$ and the speed v as axes, as shown in FIG. 10.

In the process in step S5, the displacement detection unit 204 detects the target displacement based on the phase $\angle X_r(\omega, k)$ of the one-dimensional spectrum at the target position $R_0$ detected by the position detection unit 203 (step S5). The displacement detection unit 204 outputs the detected target displacement a(kT) to the target determination unit 209.

The target determination unit 209 uses the target displacement a(kT) received from the displacement detection unit 204 and environmental information defined at each position and identifies the type of the target (step S6).

Specifically, for example, the case in which the target determination unit 209 identifies whether the target is a mobile object, a motionless object or a motionless person, i.e., the state of the target, will be explained. In this case, the target determination unit 209 determines that the target is a mobile object (i.e., a moving body) when the target displacement a(kT) variates beyond a prescribed threshold value. Additionally, the target determination unit 209 determines that the target is motionless when the target displacement a(kT) is equal to or less than the prescribed threshold value. Furthermore, the target determination unit 209 identifies whether the target is a motionless person or a motionless object. Specifically, for example, tests, simulations and the like are performed on targets, and the displacement variation of each target is prestored in a storage unit. The target determination unit 209 compares the variation in the target displacement obtained by the current determination with the variations in the displacement of the targets stored in the storage unit, and if a target having a displacement variation that can be considered to be the same, to within an error range, in the storage unit is a person, then the target is identified as a motionless person. Additionally, the target determination unit 209 compares the variation in the target displacement obtained by the current measurement with the variations in the displacement of the targets stored in the storage unit, and if a target having a displacement variation that can be considered to be the same, to within an error range, in the storage unit is an object, then the target is identified as a motionless object.

Additionally, for example, the case in which the target determination unit 209 has determined that the target is a mobile object, it is defined in the environmental information that the position at which the target is located is a one-way street, and the physical type is identified from among automobiles and people will be explained. In this case, when the trend in the change in the target displacement a(kT) indicates a direction opposite to the direction in which the one-way traffic is allowed, the target determination unit 209 excludes, from the possible targets, mobile objects that are prohibited from traveling in the opposite direction, such as automobiles and motorcycles. As a result thereof, the target determination unit 209 identifies the physical type of the target as that of a person.

The processing in the object detection device 1 according to the third embodiment of the present invention described above can be summarized as represented by the image diagram shown in FIG. 10.

By the processes in step S1 and step S2, the object detection device 1 irradiates targets with a frequency-sweeping RF transmission signal u(t) and receives a reception signal $u_0(t)$ reflected by the targets.

By the process in step S3, the object detection device 1 generates an IF signal by mixing the RF transmission signal u(t) with the reception signal $u_0(t)$.

By the process in step S7, the object detection device 1 detects the positions $R_0$ of the targets based on the positions of amplitude peaks in a two-dimensional spectrum $X(\omega, \psi)$. By the process in this step S7, the object detection device 1 specifies the positions of the targets at a positional resolution of approximately 30 cm.

By the process in step S5, the object detection device 1 specifies the displacement of the targets based on the phase $\angle X_r(\omega, k)$ of the one-dimensional spectrum at the positions $R_0$ of the targets. By the process in step S6, the object detection device 1 identifies the types of the targets.

Each functional unit may store the expressions necessary for processing. Alternatively, storage units may store the expressions, and the each functional unit may read the necessary expressions from the storage units.

Simulation Example

A simulation example will be explained.

The displacement detection performance was tested by simulations for the case in which the displacement was measured after detecting the target position by means of a one-dimensional Fourier transform as in the second embodiment of the present invention, and for the case in which the displacement was measured after detecting the target position by means of a two-dimensional Fourier transform as in the third embodiment of the present invention. In the simulations, the parameters in the simulator were set so that a target T1 was located at a position lying at a range of 100 m from the object detection device 1, and a target T2 was located at a position lying at a range of 20 m from the object detection device 1. Additionally, on the supposition that the target T1 was an automobile, the parameters in the simulator were set so as to have the entire automobile vibrate at an amplitude of 1 cm and a frequency of 10 Hz in the direction of the range from the object detection device 1 to the target. Additionally, on the supposition that the target T2 was a pedestrian, the parameters in the simulator were set so as to have the entire body of the pedestrian move at a amplitude of 10 cm and a frequency of 1 Hz in the direction of the range from the object detection device 1 to the target.

Figure 11:
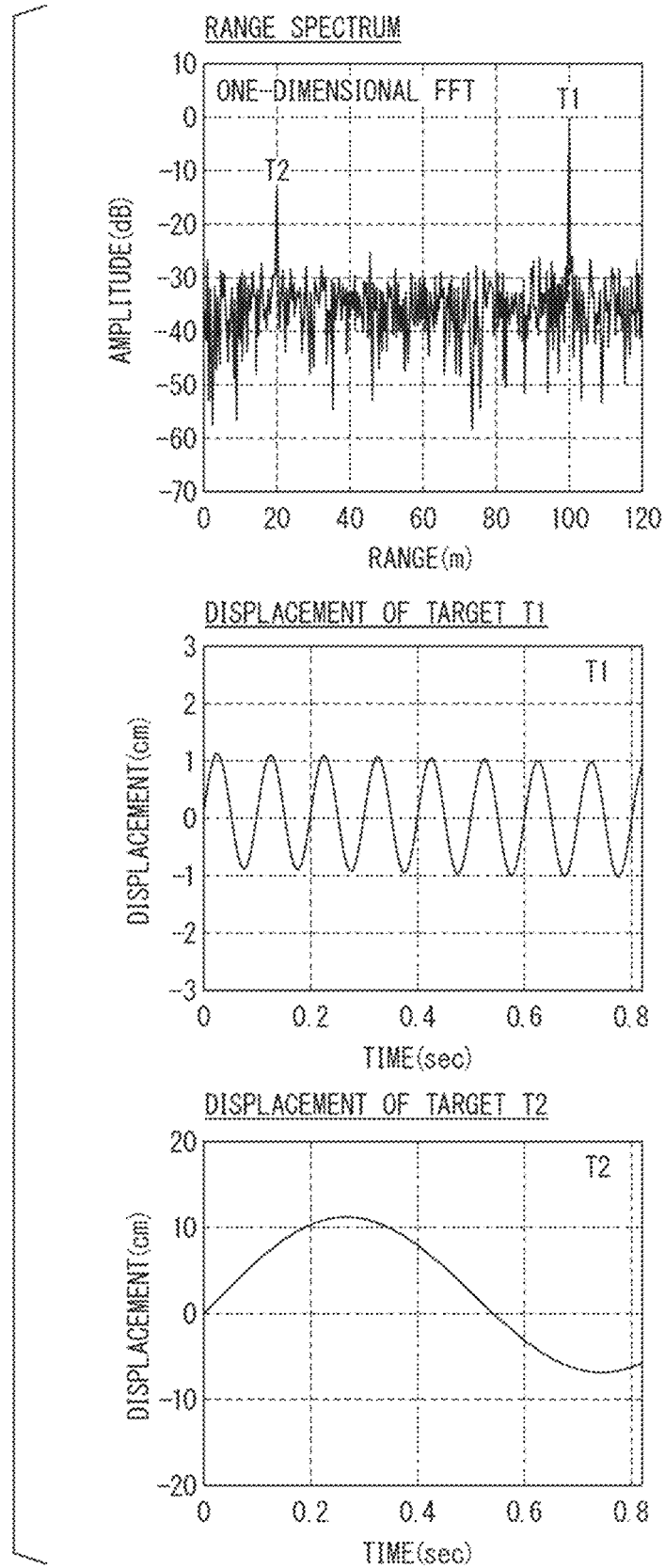
FIG. 11 is a first diagram showing simulation results for the second embodiment of the present invention.

FIG. 11 shows the simulation results when the positions (ranges) and the displacements of the targets T1 and T2 were each detected in accordance with the process indicated for the second embodiment of the present invention. The simulation results show the spectrum, the displacement of the target T1 and the displacement of the target T2. As shown in FIG. 11, it can be understood that, due to the object detection device 1 indicated in the second embodiment of the present invention, the positions and the displacements (vibrations) of the targets T1 and T2 are detected with values exactly according to the set arrangement.

Figure 12:
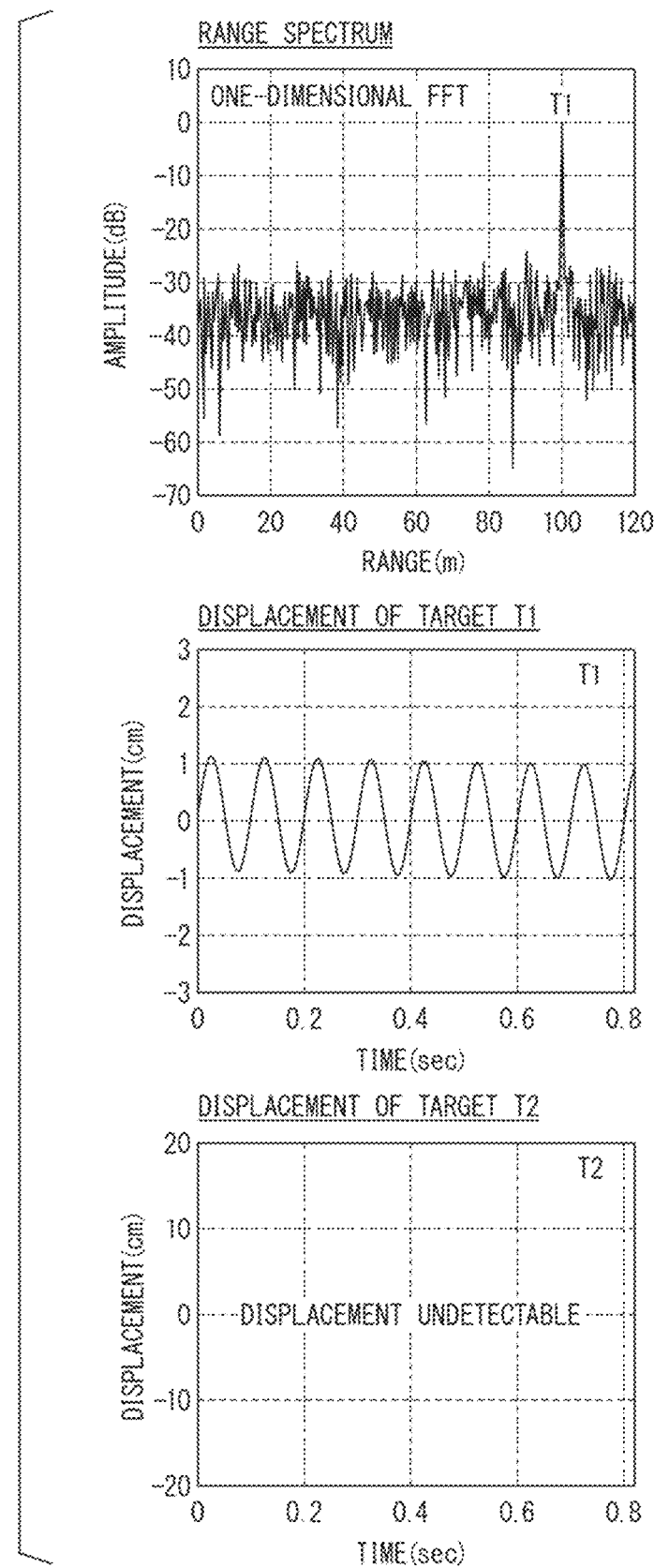
FIG. 12 is a second diagram showing simulation results for the second embodiment of the present invention.

Next, a simulation similar to the above-mentioned simulation was performed with the position of the target T2 changed from 20 m to 50 m. FIG. 12 shows the simulation results when the positions (ranges) and the displacements of the targets T1 and T2 were each detected in accordance with the process indicated in the second embodiment of the present invention. The simulation results show the spectrum, the displacement of the target T1 and the displacement of the target T2. In the range spectrum shown in FIG. 12, the amplitude peak of the target T2 is lost in the noise floor and cannot be detected. For this reason, the position and the presence of the target T2 cannot be detected, and the displacement of the target T2 cannot be detected.

Figure 13:
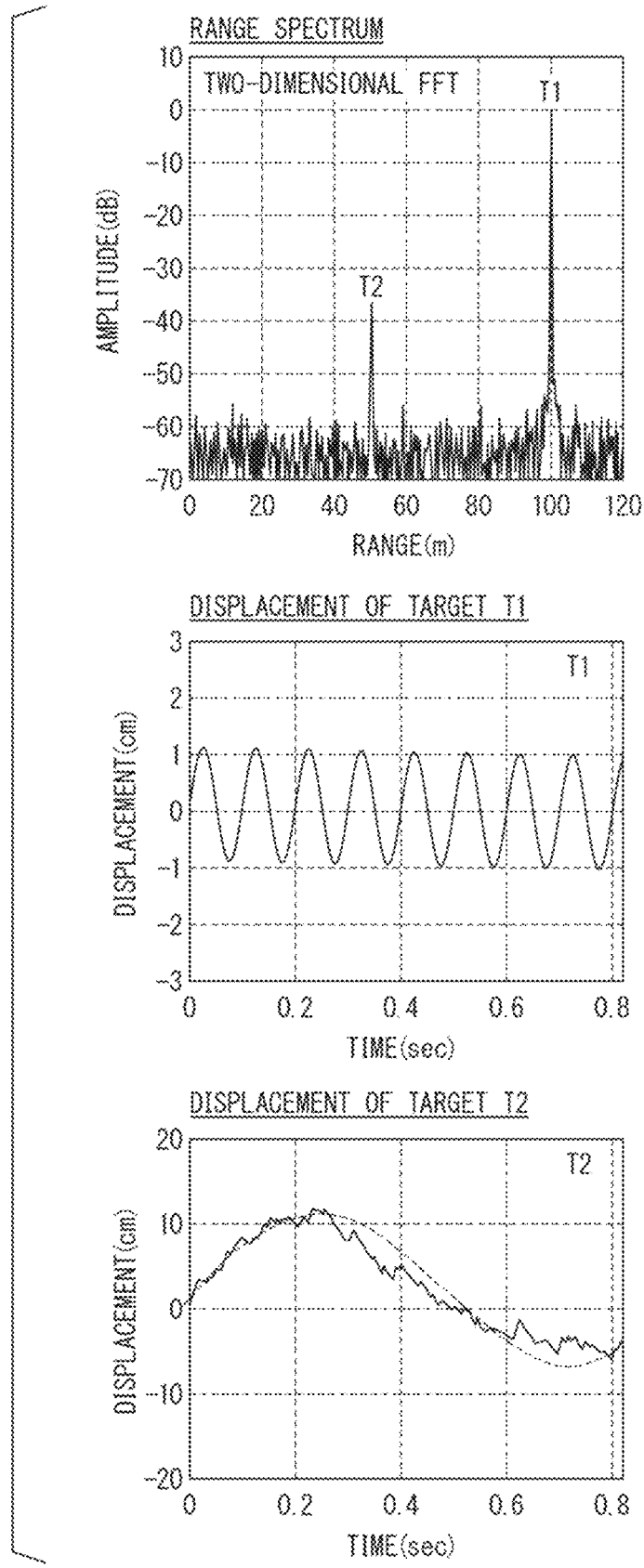
FIG. 13 is a diagram showing simulation results for a third embodiment of the present invention.

Next, FIG. 13 shows the results when the positions (ranges) and the displacements of the targets T1 and T2 were each detected in accordance with the process indicated in the third embodiment of the present invention, with the position of the target T2 still at 50 mm. The simulation results show the spectrum, the displacement of the target T1 and the displacement of the target T2. In the range spectrum shown in FIG. 13, the noise floor is lowered and the amplitude peak of the target T2 can be detected. As mentioned above, this is the effect in which the SN ratio due to the method in which the target position $R_0$ is detected based on the position of an amplitude peak in the two-dimensional spectrum $X(\omega, \psi)$ is improved by $10 \log_{10}(K)$ decibels in comparison to the SN ratio due to the method in which the target position $R_0$ is detected based on the position of the amplitude peak in a one-dimensional spectrum $X_r(\omega, k)$ (where K is the number of chirps). With the process indicated as the third embodiment of the present invention, the amplitude peak of the target T2 can be detected, so the position information thereof can also be used to detect the displacement of the target T2.

Therefore, the processing flow of the object detection device 1 according to the third embodiment of the present invention (in which the position is detected by using a two-dimensional Fourier transform) is suited to cases in which there is a lot of noise in the environment in which the object is to be detected in comparison to the processing flow of the object detection device 1 according to the second embodiment of the present invention (in which the position is detected by using a one-dimensional Fourier transform).

Therefore, the embodiments should preferably be used by selecting either the processing flow of the object detection device 1 according to the second embodiment of the present invention or the processing flow of the object detection device 1 according to the third embodiment in accordance with the noise in the environment in which an object is to be detected.

Actual Measurement Example

An example of actual measurement will be explained.

Figure 14:
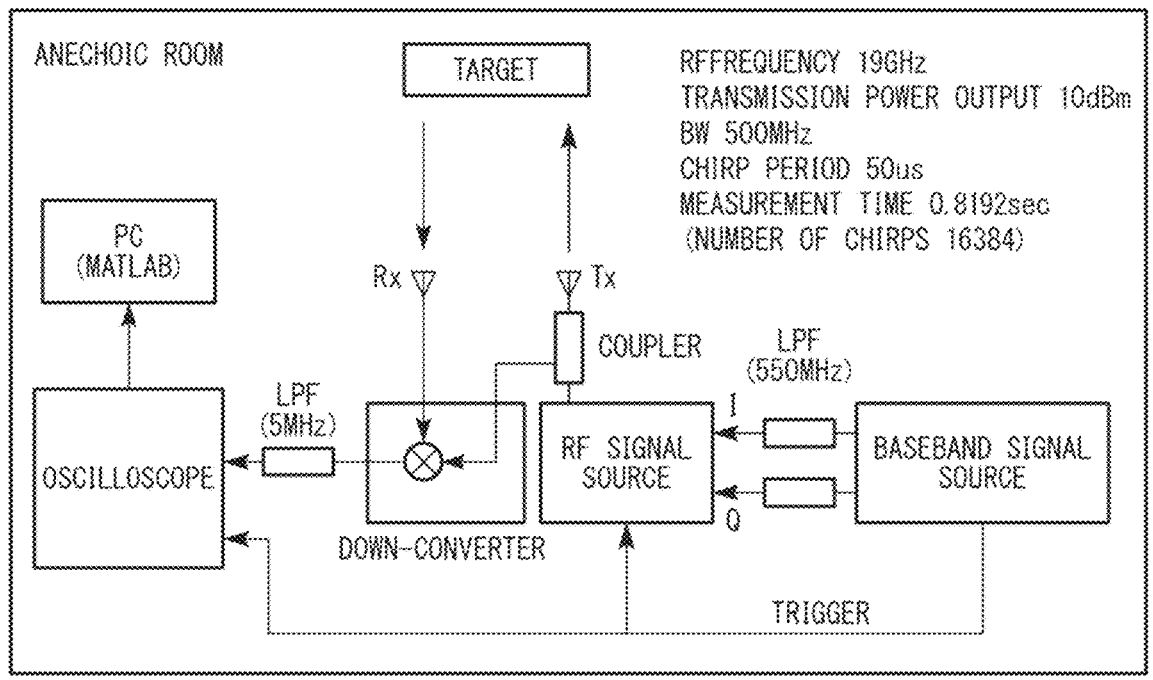
FIG. 14 is a diagram illustrating an example of a radar constructed for the purpose of taking actual measurements using the third embodiment of the present invention.

In order to take actual measurements, a radar was constructed by using a measurement device in an anechoic room as shown in FIG. 14.

A transmitter was formed from a baseband signal source, an RF signal source, a low-pass filter and a horn antenna. A datafile for a baseband I-Q signal (chirp period 50 μs, RF bandwidth 500 MHz, sampling rate 2 GS/s) was generated on a computer using MATLAB (registered trademark) (MathWorks Inc.), and downloaded from the computer to the baseband signal source. The baseband signal source outputs the baseband I-Q signal to an external IQ terminal of an RF signal source. An LPF (Low Pass Filter) having a cutoff frequency of 550 MHz is inserted between the baseband signal source and the RF signal source so that signals outside the band are not input to the RF signal source. The RF signal source up-converts the baseband signal that is input to the external IQ terminal to an RF frequency (19 GHz) and outputs RF signals from a connected transmission antenna towards a target. In the present invention, the RF frequency that is used need not be limited to 19 GHz, and any frequency may be used. In the actual measurement example, the output power of the transmitted RF signal was set to 10 dBm, but the output power of the transmitted RF signal may be any value.

A receiver comprises a horn antenna, a down-converter, an oscilloscope and an LPF. The down-converter generates an IF signal by mixing an RF signal received by the horn antenna with the transmitted RF signal acquired via a coupler. The frequency of the IF signal is roughly the same as the frequency shift $f_w$ that is generated by a lag time $\tau_0$ at the position $R_0$ at the time t=0, and in this case, the frequency is about 1 MHz or lower. In order to remove the noise in unwanted bands, the low-pass filter having a cutoff frequency of 5 MHz is provided between the down-converter and the oscilloscope. The oscilloscope (sampling rate 2 MS/s) is used to acquire the IF signal, and the acquired IF signal is transferred to the computer via a GPM (General Purpose Interface Bus). The computer analyzes the acquired IF signal, using an algorithm for performing the processes of the present invention implemented by means of MATLAB, to compute the state of the position and displacement (vibrations/fluctuations) of the target.

Since there is some lag due to the receiver itself, a range offset (error) arises. This range offset is determined by taking direct measurements in a state in which the transmission antenna is directly attached to a cable connected to the reception antenna. The range offset obtained by measurement is 1.1 m, and the lag in the receiver is calibrated by subtracting the value of this range offset from the measurement results.

Figure 15:
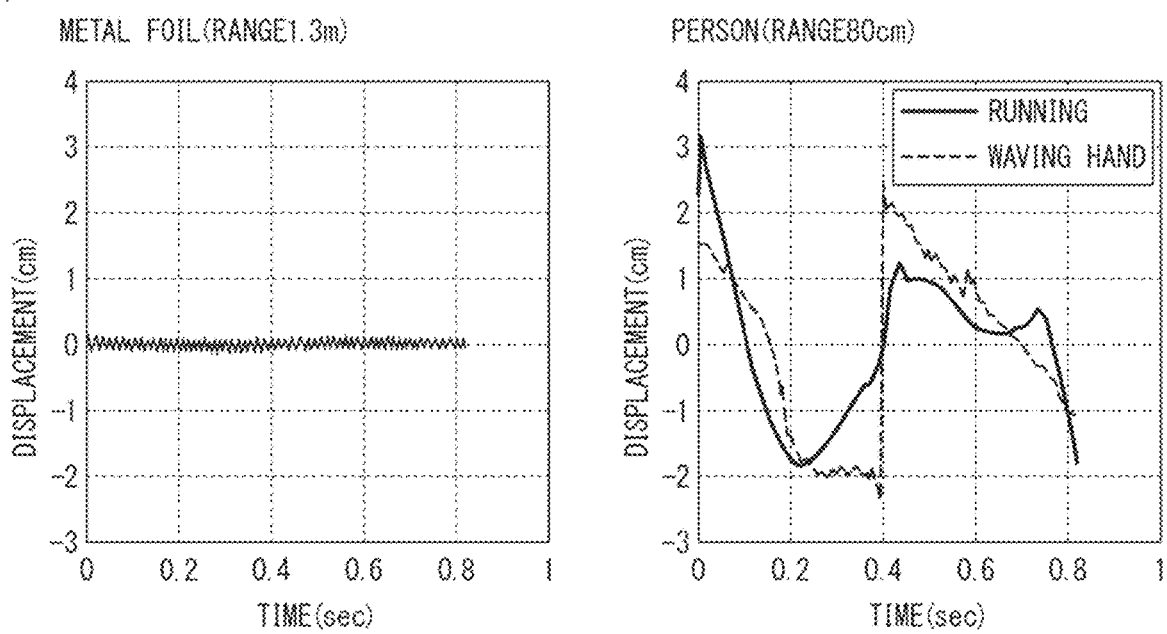
FIG. 15 is a diagram showing actual measurement results for the third embodiment of the present invention.

The states of the position and displacement of targets were measured by using an algorithm that performs the processes of the present invention. There were three measurement targets: a metal box (measurement target 1), a person in a hand waving state (measurement target 2) and a person in a running state (measurement target 3). As with the measurement results shown in FIG. 15, displacement was not detected for the metal box (measurement target 1). On the other hand, a displacement of approximately 4 to 5 cm, peak-to-peak, was detected between the person in the hand-waving state (measurement target 2) and the person in the running state (measurement target 3).

This shows that the present invention is able to identify whether or not there is target displacement with a higher range resolution performance than Fast-FMCW.

The object detection device 1 according to the third embodiment of the present invention has been explained above. The object detection device 1 according to the third embodiment of the present invention comprises a transmitter 10 and a receiver 20. The transmitter 10 comprises an irradiation unit 101, a control unit 102 and a storage unit 103. The spectrum computation unit 207 computes a two-dimensional spectrum $X(\omega, \psi)$ of an IF signal x(t) by applying a two-dimensional Fourier transform in each period. The position detection unit 203 detects the target position $R_0$ based on the position of an amplitude peak in the two-dimensional spectrum $X(\omega, \psi)$. The displacement detection unit 204 detects the displacement of the target based on the phase $\angle X_r(\omega, k)$ of the one-dimensional spectrum at the target position $R_0$ detected by the position detection unit 203. The target determination unit 209 identifies the type of the target by using the detection results from the displacement detection unit 204 and the detection results from the speed detection unit 208, or the detection results from the displacement detection unit 204, environmental information defined for each position, and the detection results from the position detection unit 203. The type of the target is identified.

In this way, the object detection device 1 can detect moving bodies in environments having more noise than the environment of the object detection device 1 according to the second embodiment of the present invention, without using complicated processes or special equipment.

Fourth Embodiment

The structure of the object detection device according to the fourth embodiment of the present invention will be explained.

The object detection device 1 according to the fourth embodiment of the present invention comprises a transmitter 10 and a receiver 20, as in the object detection device 1 according to the third embodiment of the present invention.

As in the transmitter 10 according to the second embodiment of the present invention illustrated in FIG. 4, the transmitter 10 comprises an irradiation unit 101, a control unit 102 and a storage unit 103.

As in the receiver 20 in the second embodiment illustrated in FIG. 5, the receiver 20 comprises a reception unit 201, an IF signal generation unit 202, a position detection unit 203, a displacement detection unit 204, a control unit 205, a storage unit 206, a spectrum computation unit 207, a speed detection unit 208 and a target determination unit 209.

The spectrum computation unit 207 computes a one-dimensional spectrum $X_r(\omega, k)$ of the IF signal x(t) by applying a one-dimensional Fourier transform in each period. The spectrum computation unit 207 computes a two-dimensional spectrum $X(\omega, \psi)$ of the IF signal x(t) by applying a two-dimensional Fourier transform in each period.

The position detection unit 203 detects the position $R_0$ of a target based on the position of an amplitude peak in the two-dimensional spectrum computed from the IF signal in each period.

For example, the position detection unit 203 detects the position of the amplitude peak in the two-dimensional spectrum $X(\omega, \psi)$ computed by the spectrum computation unit 207 as the target position $R_0$.

The speed detection unit 208 detects the speed of the target based on multiple IF signals that are successively obtained, each in a frequency sweep period.

The target determination unit 209 identifies the type of the target by using the detection results from the displacement detection unit 204 and the detection results from the speed detection unit 208, or the detection results from the displacement detection unit 204, environmental information defined for each position, and the detection results from the position detection unit 203.

The processing in the object detection device according to the fourth embodiment of the present invention will be explained.

In this case, the processing flow in the object detection device 1 according to the fourth embodiment of the present invention shown in FIG. 16 will be explained.

Figure 16:
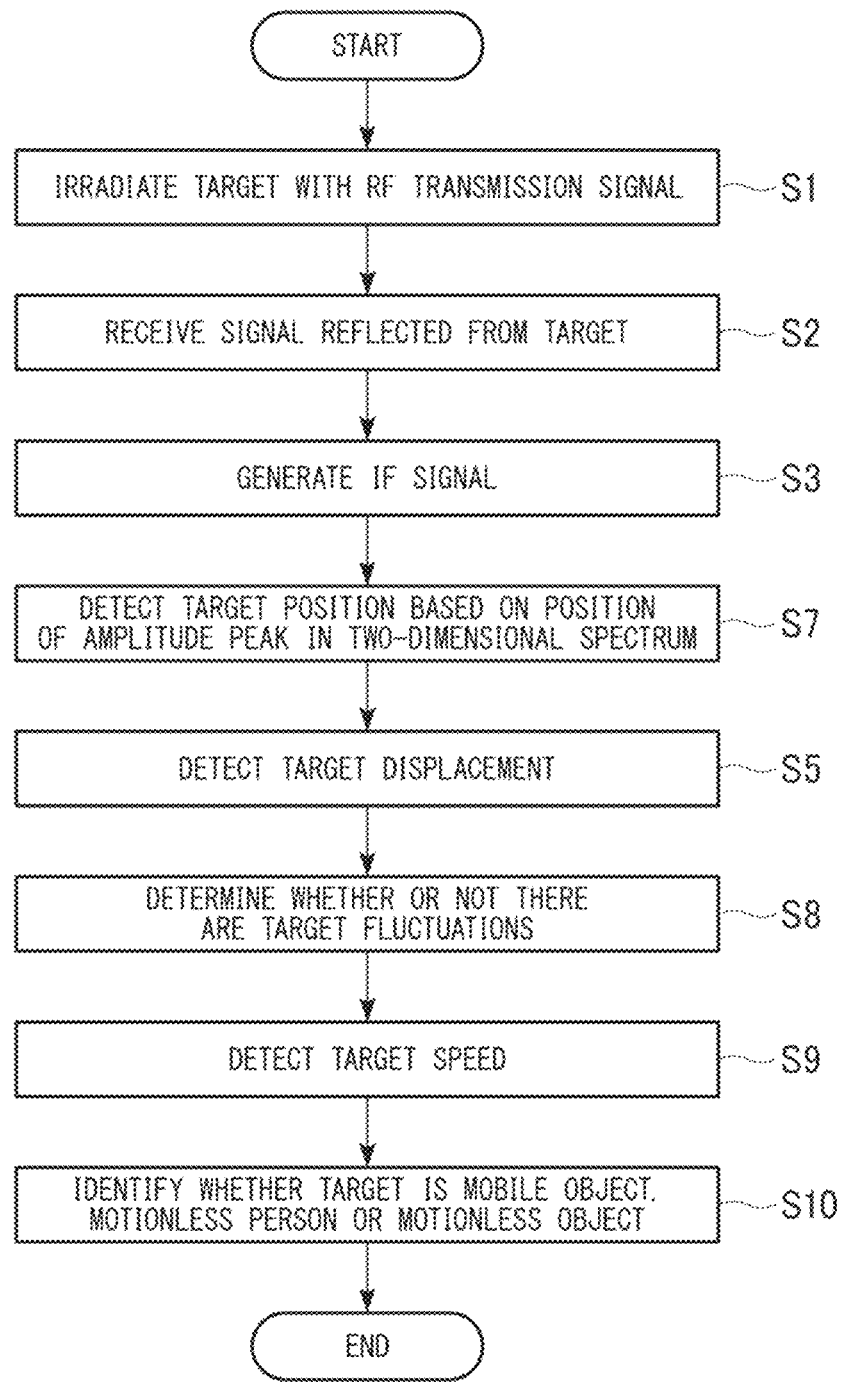
FIG. 16 is a diagram showing the processing flow in an object detection device according to a fourth embodiment of the present invention.

The processing flow of the object detection device 1 according to the fourth embodiment of the present invention shown in FIG. 16 is the processing flow for the case in which the frequency sweep period is shorter than the period of fluctuations expected in the target.

The object detection device 1 performs the processes in steps S1 to S3.

The position detection unit 203 detects the target position $R_0$ based on the position of an amplitude peak in a two-dimensional spectrum $X(\omega, \psi)$ computed by the spectrum computation unit 207 (step S7). The two-dimensional spectrum $X(\omega, \psi)$ is obtained by applying a two-dimensional Fourier transform to a matrix having multiple column vectors representing an IF signal x(t) in each period of a chirp signal. However, in this case, the frequency sweep period is shorter than the period of fluctuations expected in the target. For this reason, the resolution of the range and speed computed by the position detection unit 203 by applying a two-dimensional Fourier transform is lower than the resolution of the range and speed computed by the position detection unit 203 by applying a two-dimensional Fourier transform when there is a lot of noise in the environment in which the above-mentioned object is detected, and the frequency sweep period is longer than the period of fluctuations expected in the target.

In the processing in step S5, the displacement detection unit 204 detects the displacement of the target based on the phase $\angle X_r(\omega, k)$ of the one-dimensional spectrum at the target position $R_0$ detected by the position detection unit 203 (step S5). As mentioned above, the resolution of the range and speed computed by the position detection unit 203 by applying a two-dimensional Fourier transform is low. For this reason, the resolution of the displacement detected by the displacement detection unit 204 is low.

The displacement detection unit 204 outputs the displacement a(kT) of the detected target to the target determination unit 209.

The target determination unit 209 receives the target displacement a(kT) from the displacement detection unit 204. The target determination unit 209 identifies the type of the target by using the target displacement a(kT) received from the displacement detection unit 204 and environmental information defined for each position. In this case, the environmental information is, for example, information indicating that there are no limitations at the target position. Additionally, in this case, the resolution of the displacement detected by the displacement detection unit 204 is low. For this reason, the target determination unit 209 identifies only whether or not there is target displacement, i.e., whether or not there are fluctuations in the target (step S8).

The speed detection unit 208 detects the speed of the target based on an IF signal in each frequency sweep period (step S9). Specifically, for example, the speed detection unit 208 acquires, from the position detection unit 203, the target speed computed by means of a two-dimensional Fourier transform. For example, the speed detection unit 208 acquires, from the position detection unit 203, position and speed information (i.e., target position and speed information) indicating a peak in the two-dimensional Fourier transform indicating the relationship between the position and the speed.

The speed detection unit 208 outputs the acquired target speed information to the target determination unit 209.

The target determination unit 209 receives the target speed information from the speed detection unit 208. The target determination unit 209 identifies whether the target is a mobile object, a motionless person or a motionless object based on the received speed information and the information regarding whether or not there are target fluctuations identified by the process in step S8 (step S10).

Figures 17, 18:
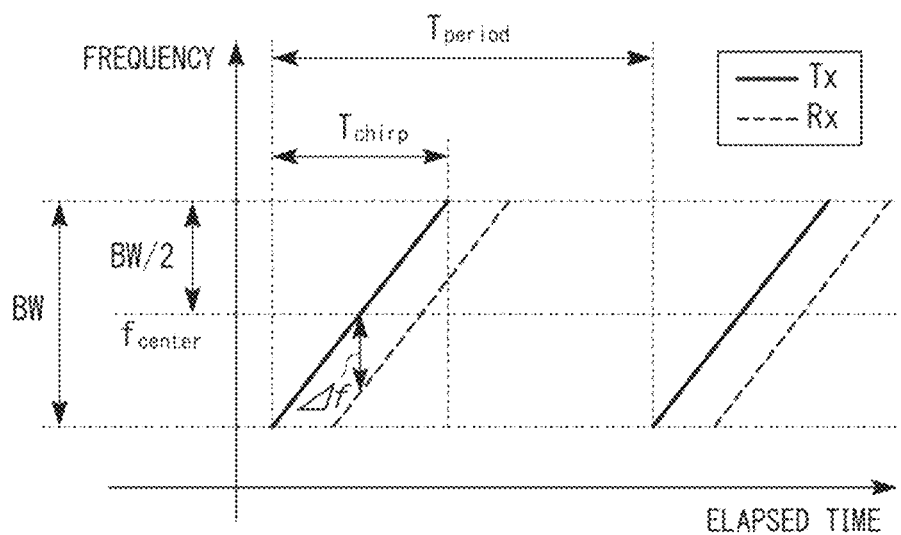
FIG. 17 is a diagram showing an example of identification using speed information in the object detection device according to the fourth embodiment of the present invention.
FIG. 18 is a diagram showing a chirp signal in an FMCW scheme in an actual measurement example using the object detection device according to the fourth embodiment of the present invention.

Specifically, for example, suppose that, by the process in step S8, the target determination unit 209 has determined that there are fluctuations in a target A and a target B, and there are no fluctuation in a target C, as shown in FIG. 17. Additionally, suppose that the target determination unit 209 has acquired, from the speed detection unit 208, information regarding target A indicating a speed other than a speed that is not more than a threshold value by which target A can be assumed to be at rest, in other words, a speed indicating movement. Additionally, the target determination unit 209 acquires, from the speed detection unit 208, information regarding target B and target C indicating a speed of 0 (zero), in other words, a speed indicating rest. In this case, the target determination unit 209, as indicated by the identification results in FIG. 17, identifies target A as a pedestrian, target B as a motionless person, and target C as a motionless object.

Actual Measurement Example

The processing in the object detection device 1 according to the fourth embodiment of the present invention described above can be summarized as indicated below.

FIG. 18 shows a chirp signal having a central frequency $f_{center}$ and a bandwidth BW, emitted by the transmitter 10. The frequency of the chirp signal transmitted at intervals of $T_{period}$ is increased linearly, within the sweep time $T_{chirp}$, from $f_{center}-(BW/2)$ to $f_{center}(BW/2)$. In Frequency-Modulated Continuous-Wave (FMCW) radar, the range r to the object (target) is determined, from the frequency difference $\Delta f$ between the transmitted chirp signal (Tx) and the received chirp signal (Rx), by $r=(\Delta f \times c \times T_{chirp})/(2BW)$. In this case, the symbol c represents the speed of light.

Figure 19:
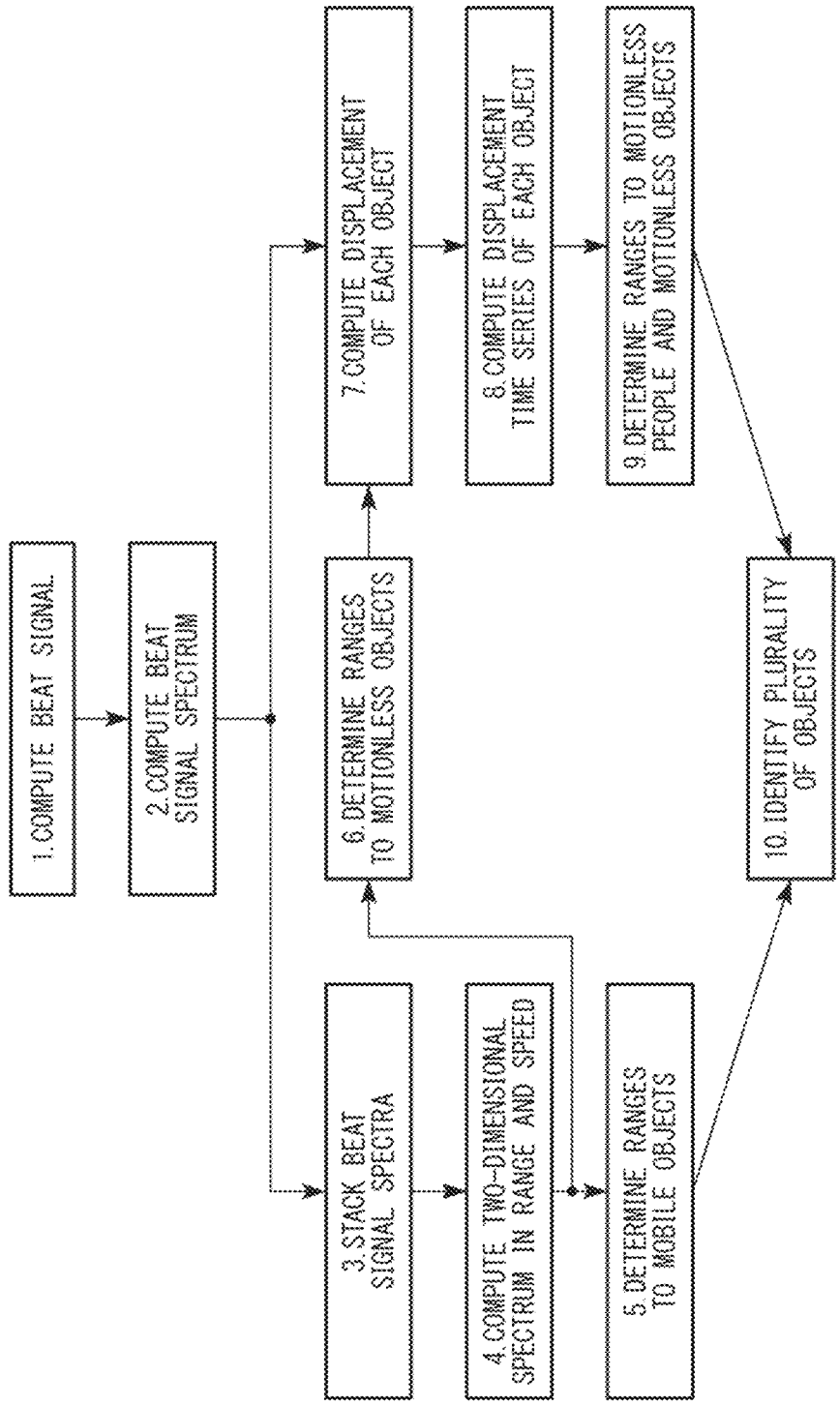
FIG. 19 is a diagram showing identification procedures for a mobile object, a motionless person and a motionless object in the actual measurement example using the object detection device according to the fourth embodiment of the present invention.

FIG. 19 is an image diagram showing the identification procedure (process 1 to process 10) for a mobile object, a motionless person and a motionless object by the object detection device 1 according to the fourth embodiment of the present invention.

The range from the radar to the mobile object is determined in process 1 to process 5 shown in FIG. 19. In process 1, the product of the transmitted and received signals is obtained for each sample (mixing), a Low-Pass Filter (LPF) is used to extract the low-frequency components, and a beat signal (one row and n columns) corresponding to a single chirp is constructed from n samples. In process 2, a Discrete Fourier Transform (DFT) is applied to a frame with N (a power of 2) samples, generated by zero-padding both sides of the beat signal, thereby deriving a beat signal spectrum (one row and N columns). The elements in the beat signal spectrum are the frequency differences Δf between the transmitted and received signal, corresponding to the range to the object. In process 3, beat signal spectra for m consecutive chirps are stacked in the column direction to generate an m-chirp beat signal spectrum matrix (m rows and N columns). In process 4, row vectors in which all of the elements are 0 are added above and below the beat signal spectrum matrix (zero-padding), thereby forming a spectrum matrix having M rows (a power of 2) and N columns. In order to compute the speed of an object present at each range, a DFT is applied to the aforementioned spectrum matrix in the column direction, thereby obtaining a two-dimensional spectrum in range and speed. In the two-dimensional spectrum in range and speed, the elements in the row direction correspond to the range and the elements in the column direction correspond to the speed. In process 5, ranges dh, other than 0, at which there are speed peaks in the amplitude of the two-dimensional spectrum are selected to form a set A={dh} (h=1, 2, . . . ) representing the ranges to mobile objects.

Next, in process 6 to process 9, the range from the radar to a motionless person or a motionless object is determined. In process 6, ranges di, other than 0, at which there are no speed peaks are selected based on the amplitude of the two-dimensional spectrum to form a set B={di} (i=1, 2, . . . ). The set B represents the ranges to motionless objects. In process 7, a beat signal spectrum is used to compute the displacement pdi from the phase of a spectrum corresponding to the set B. In process 8, the displacement in the set B relating to m consecutive chirps is used to compute a displacement time series C={pdi, j} (di∈B, j=1, 2, . . . , m). In process 9, the phase displacement is observed for each element in the phase time series C. The ranges da at which displacement was observed were placed in the set E={da} (a∈j) and the ranges db at which displacement was not observed were placed in the set F={db} (b∈j). The set E represents the ranges to motionless people because the speed is 0 but displacement is observed, and the set F represents the ranges to motionless objects because the speed is 0 and displacement is not observed. Due to the above processes, the ranges to motionless people and motionless objects can be identified.

In process 10, objects that are located at ranges belonging to set A are identified as mobile objects, objects located at ranges belonging to set E are identified as motionless people, and objects located at ranges belonging to set F are identified as motionless objects. By the above process, the object detection device 1 according to the fourth embodiment of the present invention can distinguish between and identify multiple objects as being mobile objects, motionless people or motionless objects.

The object detection device 1 according to the fourth embodiment of the present invention was tested by actual measurement regarding the ability to identify a mobile object, a motionless person and a motionless object, using a wireless radar comprising two transmission antenna elements and four reception antenna elements at a railroad crossing. In the actual measurements, only the data from one pair of transmission and reception antennas were used. The parameters of the wireless radar are shown in FIG. 20.

Figure 21:
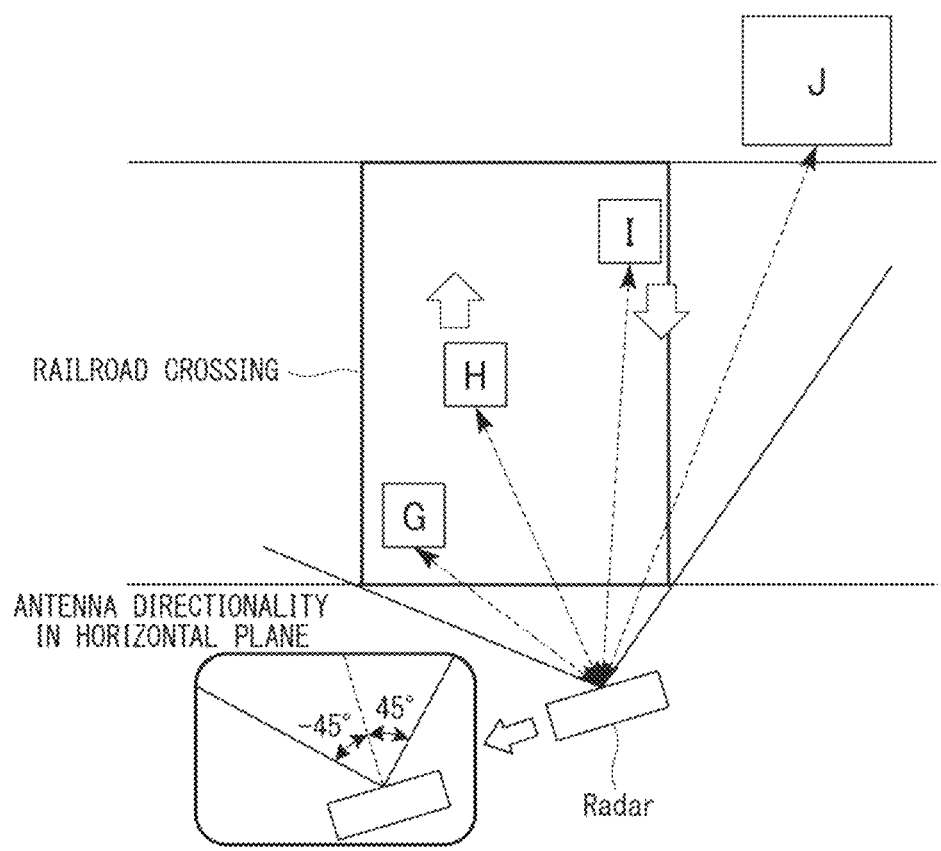
FIG. 21 is a diagram showing the parameters of a wireless radar in the actual measurement example using the object detection device according to the fourth embodiment of the present invention.

The wireless radar was fixed to a tripod approximately 1.5 m above the ground, and a beam was directed at the center of the crossing. FIG. 21 shows the positional relationship between the objects and the radar (bird's-eye view), and the horizontal beam width of the radar. The symbol G denotes two people standing at the entrance to the crossing, the symbol H denotes a bicycle that is passing through the crossing towards the opposite side of the railroad, the symbol I denotes a pedestrian who is approaching the radar from the opposite side of the railroad, and the symbol J denotes a building adjacent to the railroad.

The signals transmitted and received in the wireless radar at the time of image capture were used to identify mobile objects, motionless people and motionless objects.

First, the results of identifying the ranges to mobile objects by means of process 1 to process 5 in the object detection device 1 according to the fourth embodiment of the present invention will be explained.

Figure 22:
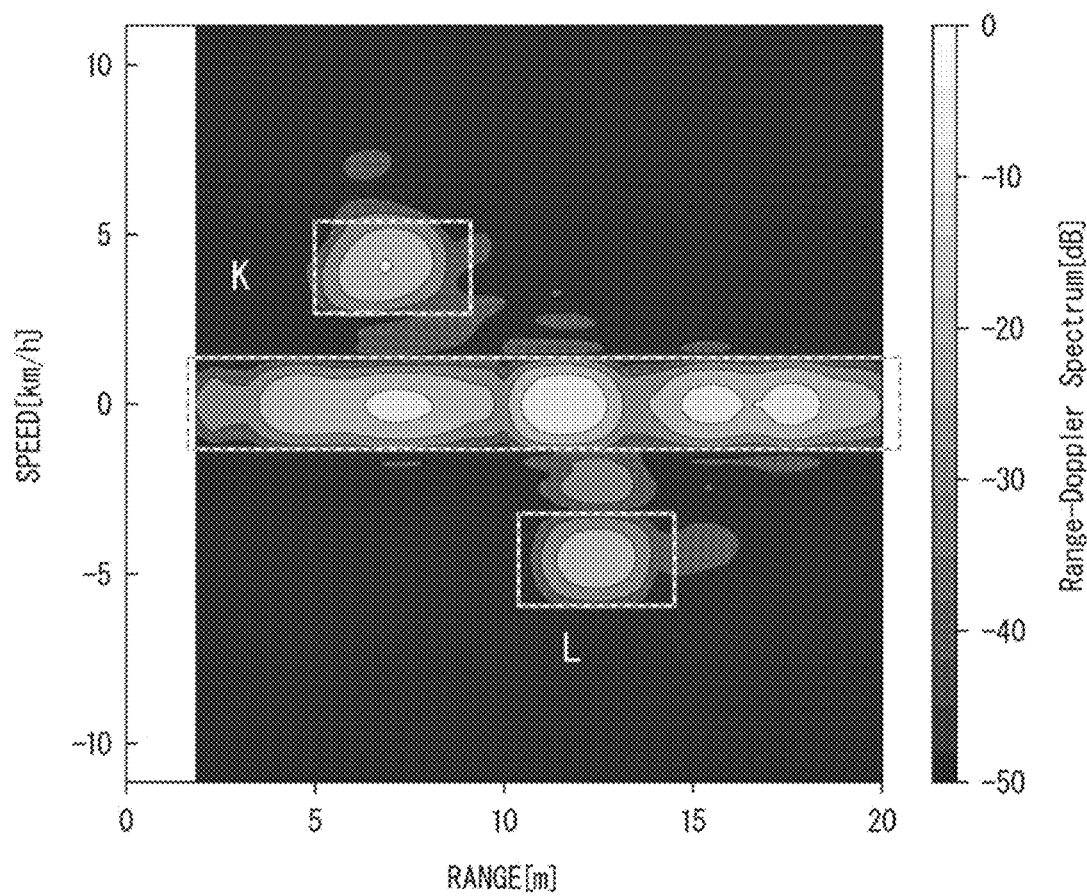
FIG. 22 is a diagram showing the amplitude of a two-dimensional spectrum in range and speed in the actual measurement example using the object detection device according to the fourth embodiment of the present invention.

The amplitude of the two-dimensional spectrum in range and speed computed in process 4 in FIG. 19 is shown in FIG. 22. The horizontal axis represents the range [m] from the wireless radar and the vertical axis represents the speed [km/h] of the object at each range. The axis in the direction perpendicular to the page surface represents the amplitude [dB], which represents the radio wave reflection intensity from an object that has the speed on the vertical axis and that is located at the range on the horizontal axis. Searching for amplitude peaks located at speeds other than 0 in accordance with process 5, there was a peak K with a speed of 4 [km/h] at a range of 6 m, and a peak L with a speed (−5 [km/h]) at a range of approximately 12 m. By means of the above processes, the set A={6 m, 12 m}, containing ranges to objects with non-zero speed, i.e., mobile objects, was obtained.

Next, the results of determining the ranges to motionless people and motionless objects by means of process 6 to process 9 in the object detection device 1 according to the fourth embodiment of the present invention will be explained.

Figure 23:
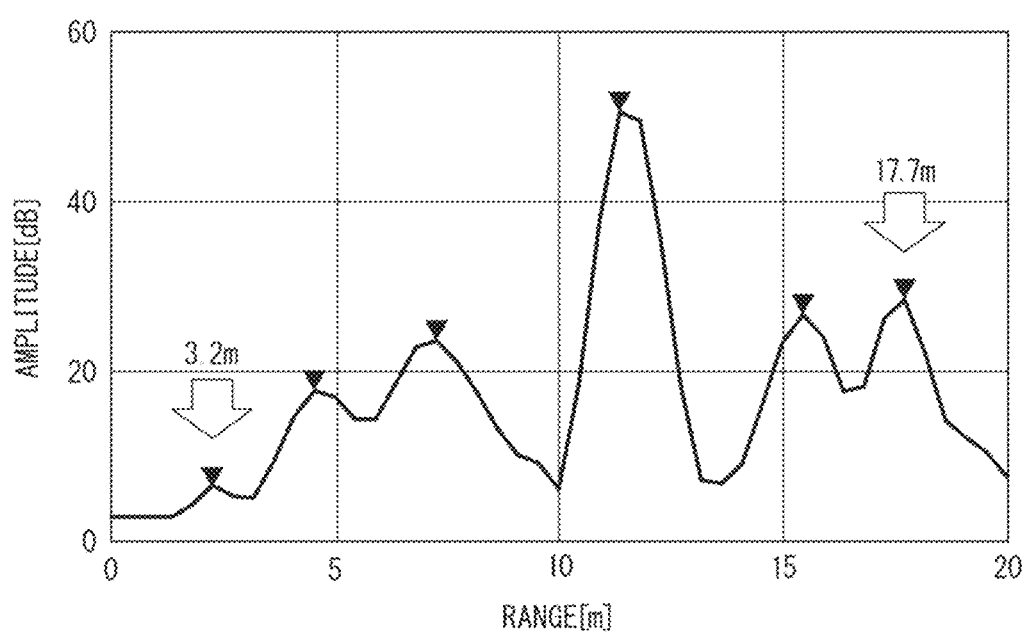
FIG. 23 is a diagram showing a row spectrum obtained by cutting out a portion at which the speed is zero from the two-dimensional spectrum in the actual measurement example using the object detection device according to the fourth embodiment of the present invention.
Figure 24:
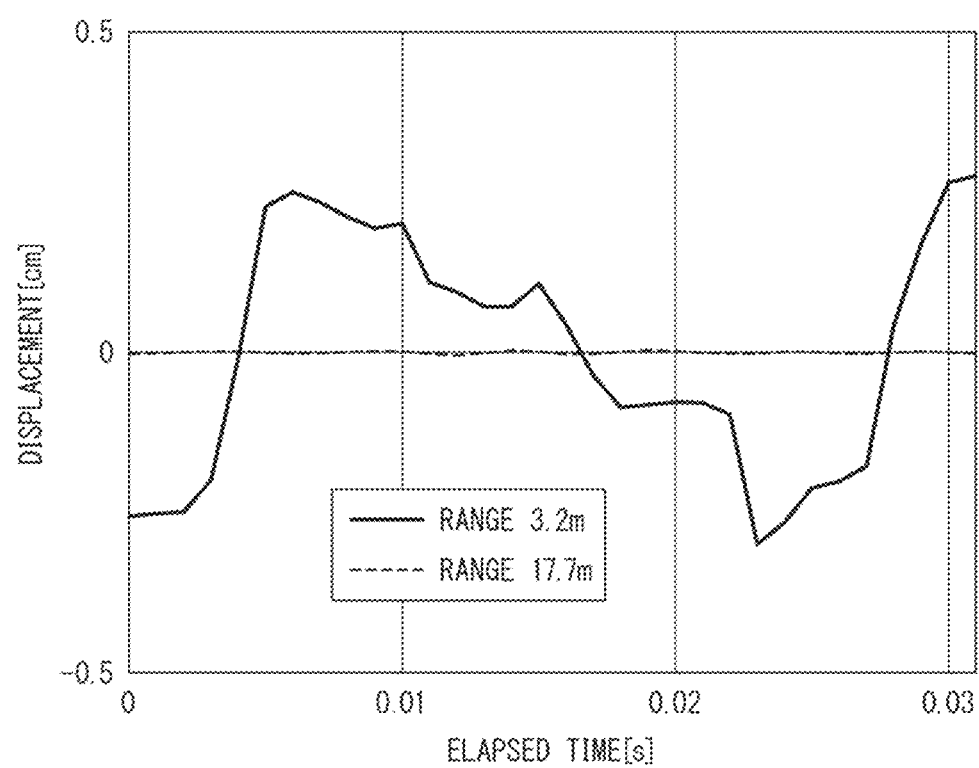
FIG. 24 is a diagram showing the displacement of objects present at various ranges in the actual measurement example using the object detection device according to the fourth embodiment of the present invention.

When performing process 6, a row spectrum in which the portions at which the speed is 0 were cut from a two-dimensional spectrum in range and speed is represented the amplitude [dB] by the vertical axis is shown in FIG. 23. The ranges at which there are amplitude peaks in FIG. 23 and at which there are no peaks at speeds other than 0 in the two-dimensional spectrum in FIG. 22 were determined and placed in the set B={3.2 m, 17.7 m}, containing ranges at which motionless objects are located. The displacements of the objects computed from the phase differences in the beat signal spectra of consecutive chirp signals in process 7 at each of the ranges in set B are shown in FIG. 24. The horizontal axis represents the time 32×$T_{period}$ (see FIG. 8) from the time at which the transmission of 32 consecutive chirps is started to the time at which it is completed, and the vertical axis represents the displacement. From FIG. 24, displacement was observed at a range of 3.2 m, whereas displacement was not observed at 17.7 m. From the above processes, the range to an object in which displacement is observed and to an object in which displacement is not observed were able to be identified, and the set E={3.2 m} of ranges to motionless people and the set F={17.7 m} of ranges to motionless objects were obtained.

Next, the identification of mobile objects, motionless people and motionless objects from the results obtained by the object detection device 1 according to the fourth embodiment of the present invention will be explained.

The set A={6 m, 12 m} contained mobile objects, and thus the objects were identified as the bicycle (H) and the pedestrian (I) in FIG. 21. Next, the set E={3.2 m} contained a range to a motionless person, and thus was identified as the two people (G) standing at the entrance to the crossing in FIG. 21. Meanwhile, the set F={17.7 m} contained a motionless object, and thus was identified as the building (J) in FIG. 21. From the above, the speed information was able to be used to identify mobile objects (bicycles and pedestrians), and motionless people and motionless objects were able to be distinguished by means of displacement information.

As a means for detecting intruders into a crossing, the identification of mobile bodies, motionless people and motionless objects by the object detection device 1 according to the fourth embodiment of the present invention (using the speed and the displacement) was confirmed by means of actual measurements. The identification by the object detection device 1 according to the fourth embodiment of the present invention is made possible by using consecutive chirp signals to determine the ranges to mobile objects based on a two-dimensional spectrum in speed and range, and using the phase differences in the beat signal spectra to identify the ranges between motionless people and motionless objects. From outdoor measurement results, it can be understood, even from actual measurement data, that the identification by the object detection device 1 according to the fourth embodiment of the present invention is effective as an intruder detection means.

The identification of a target by means of the object detection device 1 according to the fourth embodiment may involve using the speed information to distinguish between mobile objects and other objects, and then distinguishing between motionless people and motionless objects based on fluctuations in the targets identified as other objects. Additionally, the object detection device 1 may identify physical types of the mobile objects, such as people and automobiles, based on fluctuations.

Additionally, the identification of a target by means of the object detection device 1 according to the fourth embodiment may involve identifying motionless objects and other objects based on fluctuations in the targets, and then using the speed information to identify mobile objects and motionless people among the targets identified as being other objects by using the speed information.

Additionally, the identification of targets by the object detection device 1 according to the fourth embodiment does not need to involve both identification using speed information and identification using fluctuations for all targets. For example, when the object detection device 1 uses the speed information to distinguish between mobile objects and other objects as mentioned above, the mobile objects may be identified by using fluctuations if there is a need to identify the physical types of the mobile objects, or the mobile object may not be identified by using fluctuations if there is no need to identify the physical types of the mobile objects. In other words, identification using speed information and identification using fluctuations, including the order in which the processes are performed, are applied differently depending on the purpose. As a result thereof, it is possible to reduce the amount of computation required for processing, and also to adjust the necessary memory capacity so as to be the optimal capacity.

The object detection device 1 according to the fourth embodiment of the present invention has been explained above. The object detection device 1 according to the fourth embodiment of the present invention comprises a transmitter 10 and a receiver 20. The displacement detection unit 204 detects the displacement of the target based on the phase $\angle X_r(\omega)$, k) of the one-dimensional spectrum at the target position $R_0$ detected by the position detection unit 203. The target determination unit 209 receives the target displacement a(kT) from the displacement detection unit 204. The target determination unit 209 identifies the types of targets by using the target displacement a(kT) received from the displacement detection unit 204 and environmental information defined for each position. The target determination unit 209 identifies only whether or not there is target displacement, i.e., whether or not there are target fluctuations. The speed detection unit 208 detects the speed of a target based on multiple IF signals that are successively obtained, each in a frequency sweep period. The speed detection unit 208 outputs the acquired target speed information to the target determination unit 209. The target determination unit 209 receives the target speed information from the speed detection unit 208. The target determination unit 209 identifies whether the target is a mobile object, a motionless person or a motionless object based on the received speed information and information regarding whether or not there are target fluctuations.

In this way, the object detection device 1 can use the target speed information and can detect moving bodies in environments having more noise without using complicated processes or special equipment.

Fifth Embodiment

The object detection method according to the fifth embodiment of the present invention will be explained. In the object detection method according to the fifth embodiment of the present invention, the primary objective is to measure the displacement (vibrations) of a target and to identify the "physical type" (example of a type), such as whether the target is a person or an object, based on the displacement of the target.

Figure 25:
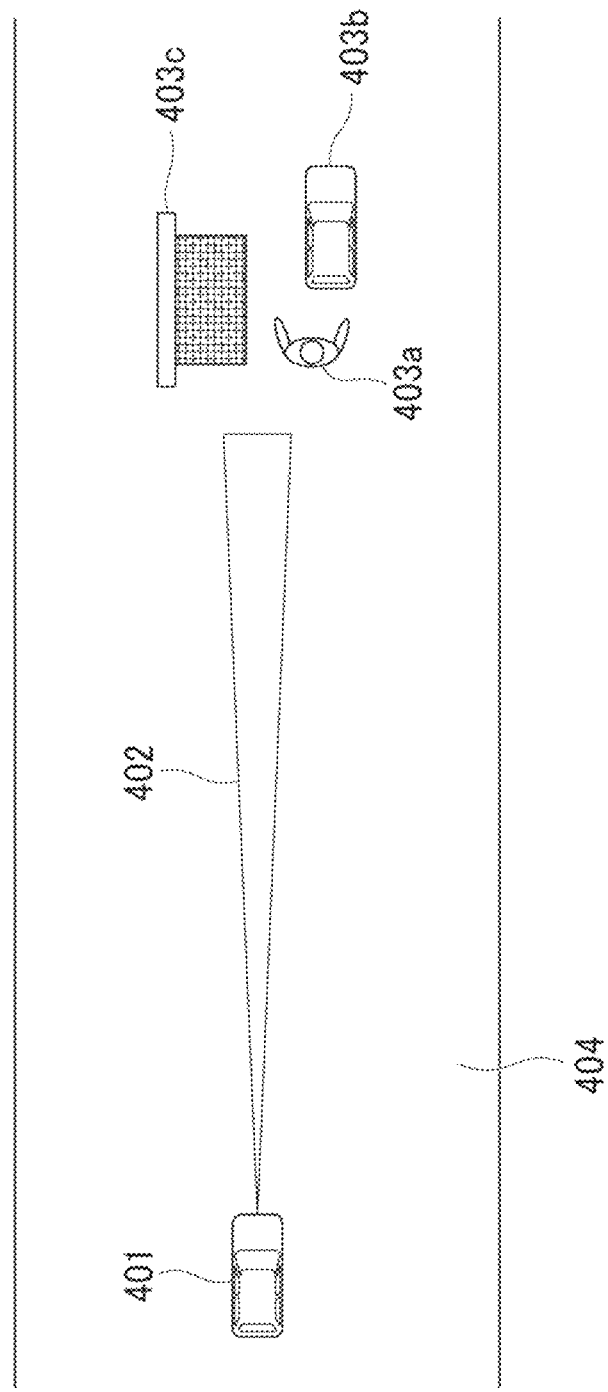
FIG. 25 is a diagram illustrating a configuration for an object detection method according to a fifth embodiment of the present invention.

The object detection method according to the fifth embodiment of the present invention is implemented by means of a moving body 401 comprising an object detection device 1, and targets 403, as illustrated in FIG. 25. While an automobile or a vehicle on a railroad or the like is contemplated as the moving body 401, the moving body 401 may also be any transport machine, such as a flying body or a ship. While pedestrians 403a, machines 403b such as automobiles, obstacles 403c and the like are contemplated as the targets 403, the targets 403 may be things other than pedestrians 403a, machines 403b such as automobiles, and obstacles 403c. Although a road 404 is contemplated as a specific location in which the object detection device 1 is to be used, the location of use may be a location other than a road 404.

The object detection device 1 mounted on the moving body 401 irradiates the targets 403 with an RF transmission signal 402, receives reflections from the targets 403, and measures the displacement of each target 403a, 403b, 403c, . . . in accordance with the procedures described for the first to fourth embodiments of the present invention.

Based on the displacement of the targets 403a, 403b, 403c, . . . measured in accordance with the procedures described for the first to fourth embodiments of the present invention, the object detection device 1 mounted on the moving body 401 identifies the physical type of each target 403a, 403b, 403c, . . . . For example, among the targets 403, the pedestrian 403a depends on the state of activity, but exhibits displacement (movement) at a frequency that is not more than a few Hz. Additionally, among the targets 403, the machine 403b such as an automobile depends on the state of activity, but exhibits displacement (vibrations) at a frequency that is approximately a few tens of Hz. On the other hand, among the targets 403, the fixed obstacle 403c does not exhibit displacement (vibrations) itself. Thus, by making use of the fact that the displacement (vibration) frequency is different for each physical type of target 403, the object detection device 1 is able to use the frequency of displacement of the targets 403 to identify the physical types (in this case, pedestrians 403a, machines 403b, obstacles 403c, etc.) of the targets detected by the object detection device 1. The feature of using the displacement frequency to identify targets is an example of the identification method, and the object detection device 1 may, more generally, use time waveform patterns of the displacement to identify targets.

The feature of using an object detection device 1 that is mounted on a moving body 401 not only to detect the presence of targets 403, as realized by an object detection device, but also to identify the physical types of the targets 403, as realized by the present invention, has the advantage of leading to improved safety. For example, if the object detection device 1 can identify that a target 403 is a pedestrian 403a, then it is possible to predict that a pedestrian 403a might perform dangerous acts such as crossing a road 404, and to take safety measures such as by reducing the movement speed of the moving body 401 beforehand. If a target 403 is identified as being a fixed obstacle 403c, it is possible to predict that the obstacle 403c will continue to be located at the same position. Additionally, if a target 403 is identified as being a machine 403b such as an automobile, it is possible to predict that the target 403 will continue to move along the road. Thus, by identifying the types of targets 403, the movement of the targets 403 can be predicted, and the prediction information can be utilized for safe navigation of the moving body 401.

Modified Example of Fifth Embodiment

Regarding the object detection method according to the fifth embodiment of the present invention, the case in which the object detection device 1 was mounted on the moving body 401 was described. On the other hand, the object detection device 1 may be used in a state of being provided on fixed equipment 411, as in the modified example of the object detection method according to the fifth embodiment of the present invention illustrated in FIG. 26.

Figure 26:
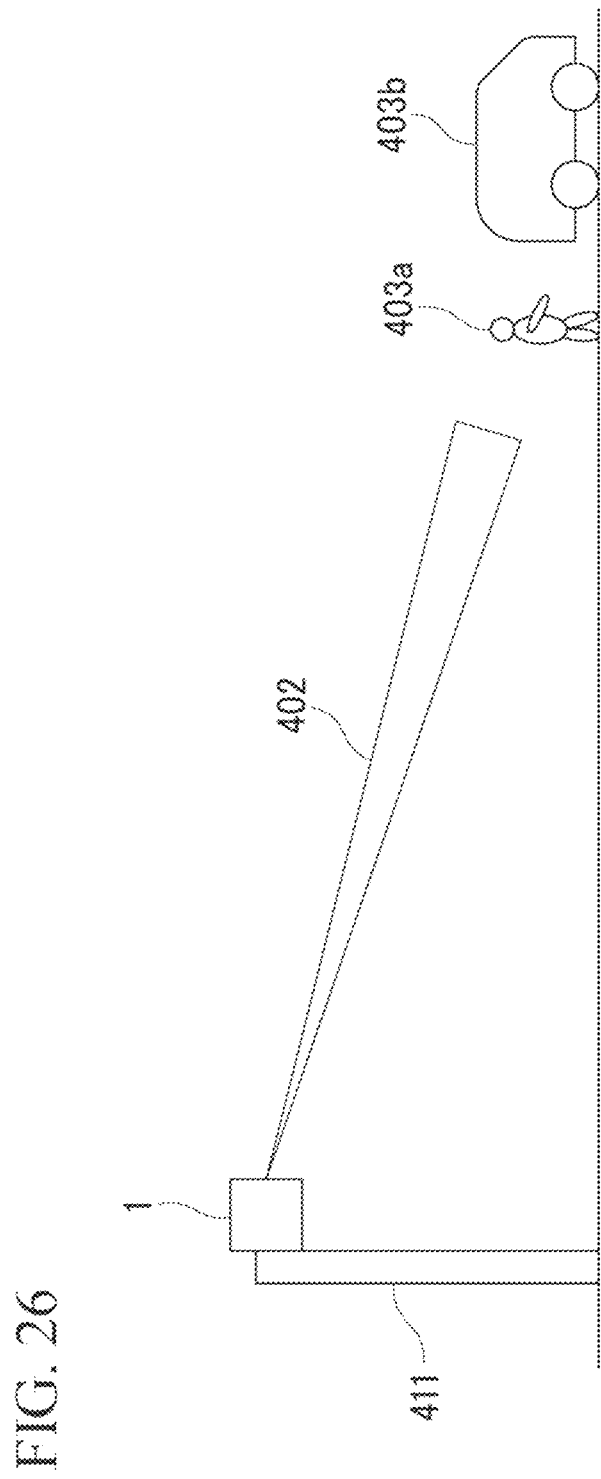
FIG. 26 is a diagram illustrating a configuration for an object detection method according to a modified example of the fifth embodiment of the present invention.

In the modified example of the object detection method according to the fifth embodiment of the present invention, it is contemplated that the object detection device 1 is provided near a specific area, such as at an intersection or railroad crossing, or within the premises of a building, and the types of targets 403 intruding into these specific areas are identified. In FIG. 26, a pedestrian 403a and a machine 403b such as a vehicle are shown as examples of targets 403, but the types of the targets 403 are not limited to being pedestrians 403a and machines 403b. As with the fifth embodiment of the present invention, by identifying the type of the target 403, it is possible to make use of the identification results to monitor the safety of areas that are dangerous in terms of traffic, such as intersections and railroad crossings, or to monitor the security in the premises of buildings.

Sixth Embodiment

The object detection method according to the sixth embodiment of the present invention will be explained. In the object detection method according to the sixth embodiment of the present invention, the primary objective is to measure the displacement (vibrations) of a target and to identify the "state" of the target based on the displacement of that target.

Figure 27:
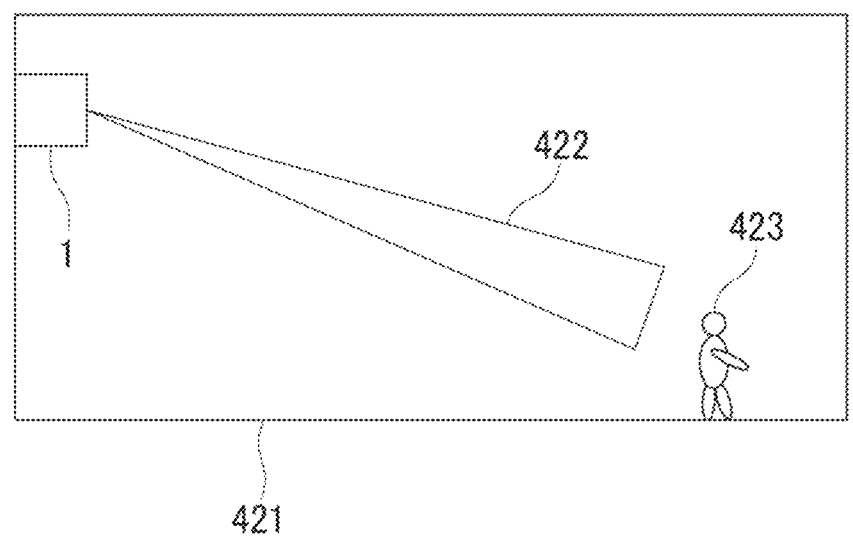
FIG. 27 is a diagram illustrating a configuration for an object detection method according to a sixth embodiment of the present invention.

In the object detection method according to the sixth embodiment of the present invention, the object detection device 1 is provided on a wall in a room 421, as shown in FIG. 27. The object detection device 1 irradiates a target 423 with an RF transmission signal 422 and receives reflections from the target 423. The object detection device 1 measures the displacement of the target 423 in accordance with the procedures described for the first to fourth embodiments of the present invention. In the sixth embodiment of the present invention, it is contemplated that the target 423 is a person.

Based on the displacement of the target (person) 423 measured in accordance with the procedures described for the first to fourth embodiments of the present invention, the object detection device 1 identifies the state of the target (person) 423. For example, when the target (person) 423 is acting violently, the frequency and amplitude of displacement will be larger than for the state of rest. By using these displacement properties, the object detection device 1 is able to identify and monitor the state (whether acting violently or at rest) of a target (person) 423. Monitoring the state of a target (person) 423 is useful for managing the health, both physical and mental, of patients and inmates in public facilities such as hospitals or prisons. Additionally, the object detection device 1 may measure fluctuations (displacement) due to the heartbeat or respiration of the target (person) 423.

FIG. 27 shows an indoor (room 421) example, but the object detection method due to the sixth embodiment of the present invention may be used in outdoor public facilities such as stations and airports. The primary objective of using the object detection method according to this embodiment of the present invention in outdoor public facilities is for security, such as the detection of violent acts.

Modified Example of Sixth Embodiment

In the object detection method according to the aforementioned sixth embodiment of the present invention, it is contemplated that the target 423 is a person. However, the target may be machines 424a, 424b, 424c, . . . , as in the modified example of the sixth embodiment illustrated in FIG. 28. In this case, based on the displacement (vibrations) of the targets (machines) 424a, 424b, 424c, . . . measured in accordance with the procedures described for the first to fourth embodiments of the present invention, the object detection device 1 makes use of the fact that abnormalities occur in the vibration state immediately before a malfunction to predict malfunctions in the targets (machines) 424a, 424b, 424c, . . . .

When measuring vibrations in the targets (machines) 424a, 424b, 424c, . . . using a contact-type vibration sensor, it is necessary to prepare the same number of vibration sensors as the number of the targets (machines) 424a, 424b, 424c, . . . . This leads to the problem wherein, when there are many of the targets (machines) 424a, 424b, 424c, . . . , considerable labor is involved in installing the contact-type vibration sensors.

In contrast therewith, in the modified example of the sixth embodiment of the present invention, a single object detection device 1 can measure the displacement (vibrations) of a plurality of targets (machines) 424a, 424b, 424c, . . . simultaneously. By using the object detection device 1, it is possible to obtain the advantage that there is no labor involved in attaching vibration sensors.

Figure 28:
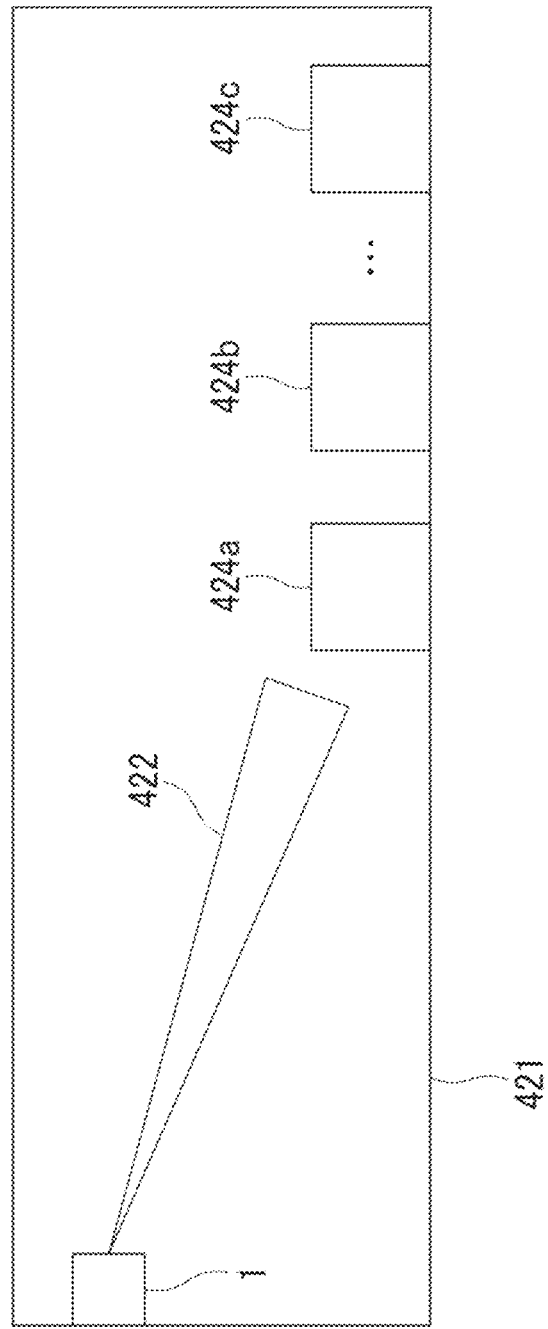
FIG. 28 is a diagram illustrating a configuration for an object detection method according to a modified example of the sixth embodiment of the present invention.

In FIG. 28, the targets (machines) 424a, 424b, 424c, . . . are placed indoors (room 421), but the targets (machines) 424a, 424b, 424c, . . . may also be placed outdoors. Additionally, the targets measured by the object detection device 1 may be civil engineering structures such as building or bridges.

Seventh Embodiment

The in-vehicle radar system according to the seventh embodiment of the present invention will be explained.

Figure 29:
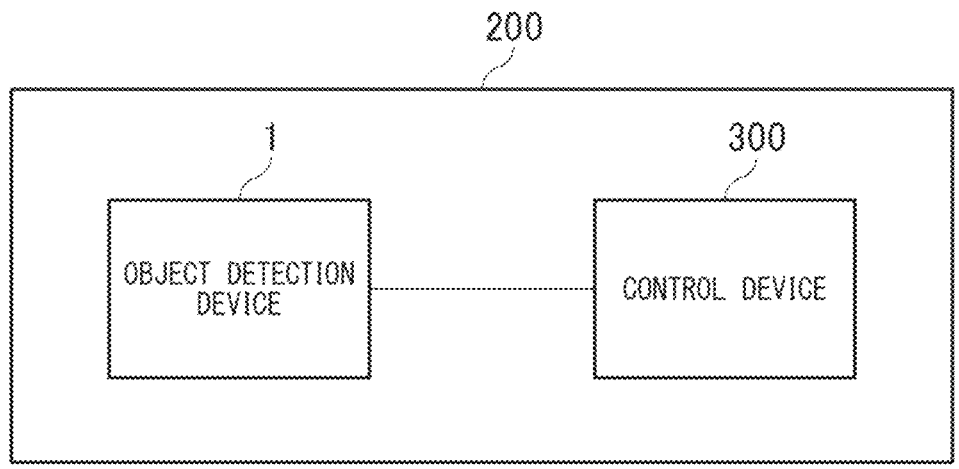
FIG. 29 is a diagram illustrating the structure of an in-vehicle radar system according to a seventh embodiment of the present invention

The in-vehicle radar system 200 according to the seventh embodiment of the present invention, as illustrated in FIG. 29, comprises an object detection device 1 and a control device 300.

The in-vehicle radar system 200 is mounted on an automobile.

The object detection device 1 according to the seventh embodiment of the present invention comprises a transmitter 10 and a receiver 20.

The object detection device 1 according to the seventh embodiment of the present invention is an object detection device 1 according to one of the abovementioned embodiments of the present invention.

The object detection device 1 detects the positions and displacements of targets.

The object detection device 1 outputs the detected target positions and displacements to the control device 300.

The control device 300 acquires the positions and displacements of targets from the object detection device 1.

The control device 300 controls at least one of the brakes and the engine power output of the automobile based on the acquired positions and displacements.

For example, if the control device 300 acquires position and displacement information indicating a person or another automobile as a target, and the position thereof is assessed as being a position for which there is a sufficient braking distance, then the engine power output is reduced or the control device 300 lightly applies the brakes and causes the automobile to decelerate. Additionally, if the control device 300 acquires position and displacement information indicating a person or another automobile as a target, and the position thereof is assessed as posing a danger unless the automobile is immediately stopped, then the engine power output is lowered and the brakes are strongly applied to stop the automobile.

In this manner, the in-vehicle radar system 200 can avoid collisions between the automobile and the targets.

Eighth Embodiment

The monitoring radar system according to the eighth embodiment of the present invention will be explained.

Figure 30:
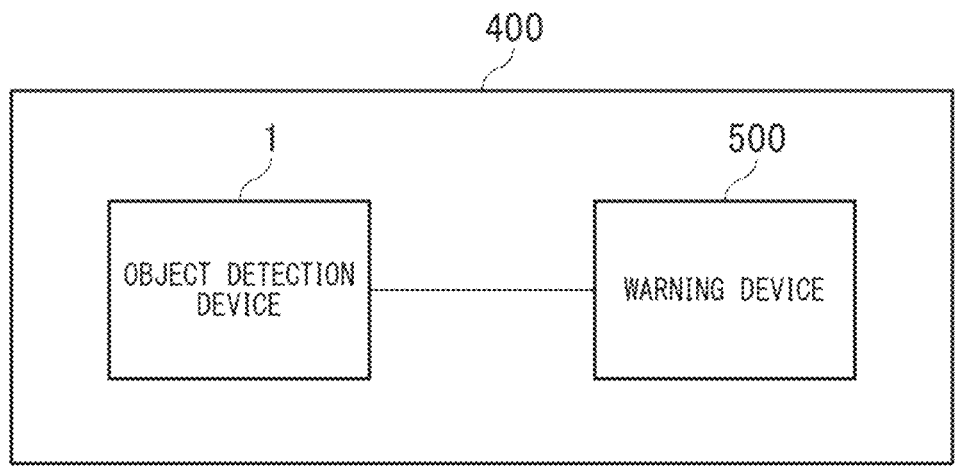
FIG. 30 is a diagram illustrating the structure of a monitoring radar system according to an eighth embodiment of the present invention

The monitoring radar system 400 according to the eighth embodiment of the present invention, as illustrated in FIG. 30, comprises an object detection device 1 and a warning device 500.

The monitoring radar system 400 is provided, for example, in a hospital room.

The object detection device 1 according to the eighth embodiment of the present invention comprises a transmitter 10 and a receiver 20.

The object detection device 1 according to the eighth embodiment of the present invention is an object detection device 1 according to one of the abovementioned embodiments of the present invention.

The object detection device 1 detects the position and displacement of a target.

The object detection device 1 outputs the detected target position and displacement to the warning device 500.

The warning device 500 acquires the position and displacement of the target from the object detection device 1.

The warning device 500 outputs an alarm based on the acquired position and displacement.

For example, the warning device 500 acquires information on the position and displacement (movement) of a person (patient) as the target. When it is determined that the displacement is less than or equal to a prescribed displacement for at least a certain period of time, the warning device 500 determines that the person is almost completely motionless or has undergone cardiac arrest, and outputs a signal to an alarm in the hospital room or a nurse center to notify other people that the person who is the target is in a poor physical condition. Additionally, in nursing homes or in the homes of solitary elderly people, the object detection device 1 could be arranged to detect, from the displacement and position of the target, that the target has suddenly fallen or does not rise even after the usual wake-up time has passed. The alarm could be a sound or a display, and may further be an emergency alert via a communication line or a notification to a portable terminal. When using a radar-based monitoring system as in the monitoring radar system 400, an image of the target is not captured, thus providing the advantage that personal privacy is maintained.

In this manner, the monitoring radar system 400 can let other people know when the physical condition of a person has become poor or whether or not the person is well, medical doctors and nurses can be immediately contacted, and the medical doctors and nurses can immediately treat the person in the poor physical condition.

The monitoring radar system 400 may also monitor inmates in a prison or the like in a manner similar to that described above. Additionally, the monitoring radar system 400 may be used for security, such as by determining the displacement (movement) of a person who is indoors or in an elevator, and contacting a security company if it is assessed that the displacement of the person is large (the person is acting violently).

The processing in the respective embodiments of the present invention may be implemented in a combined manner.

The first and fourth embodiments are embodiments for "cases in which the frequency sweep period is shorter than the period of fluctuations expected in the target" (i.e., cases in which the measurement time is short), and the second and third embodiments are embodiments for "cases in which the frequency sweep period is longer than the period of fluctuations expected in the target" (i.e., cases in which the measurement time is long). However, in an actual measurement environment, there may be a plurality of targets having different expected fluctuation periods. For this reason, even when the same RF transmission signal is used, for targets having different expected fluctuation periods, the frequency sweep period of the RF transmission signal is sometimes shorter than and sometimes longer than the expected fluctuation periods of the targets.

Therefore, when there are a plurality of targets with different expected fluctuation periods, appropriate processes among the processes indicated for the respective embodiments of the present invention may be performed for each type of target, namely, targets in which the frequency sweep period is shorter than the expected fluctuation period, and targets in which the frequency sweep period is longer than the expected fluctuation period.

In the processing flow in the embodiments of the present invention, the sequence of the processes may be changed as long as appropriate processes are performed.

Specifically, for example, in the fourth embodiment of the present invention shown in FIG. 16, the processing in step S9 may be executed before the processing in step S5. When the processing in step S9 is executed before the processing in step S5, the processing in step S5 and subsequent steps need only be performed for stationary objects (speed 0) according to the target identification. In this case, mobile objects have already been identified by the processing in step S9, so the identification process becomes faster.

The storage units 103, 206 and other storage units in the embodiments of the present invention may each be provided anywhere as long as there is appropriate transmission and reception of information. Additionally, the storage units 103, 206 and other storage units may each be provided in multiple parts and the data may be stored in a distributed manner, as long as there is appropriate transmission and reception of information.

While embodiments of the present invention have been described, the above-mentioned object detection device 1 and other control devices may have computer systems in the interiors thereof. Furthermore, the steps in the above-mentioned processes are stored, in the form of programs, on computer-readable recording media, and the above-mentioned processes are performed by a computer reading and executing these programs. A specific example of a computer is indicated below.

Figure 31:
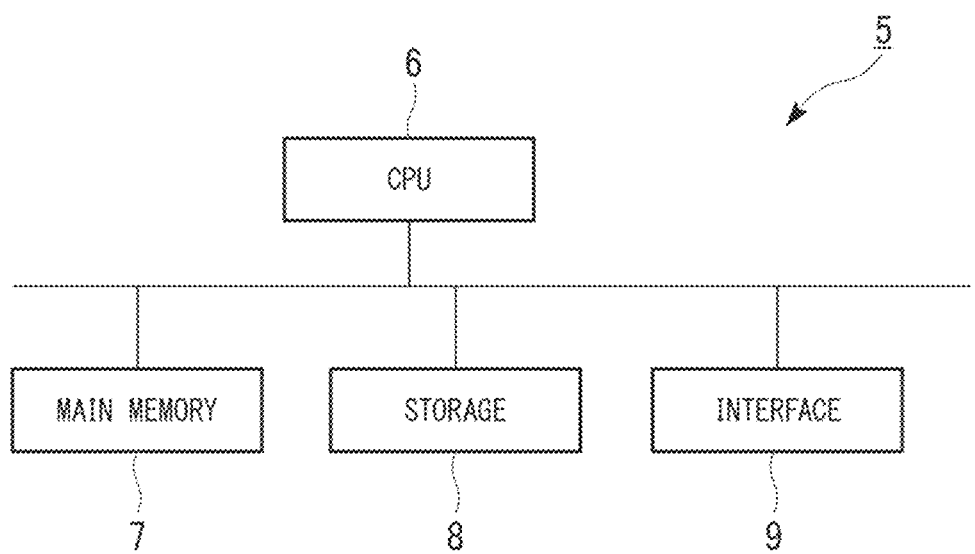
FIG. 31 is a schematic block diagram illustrating the structure of a computer according to at least one embodiment.

FIG. 31 is a schematic block diagram showing the structure of a computer according to at least one embodiment.

The computer 5, as illustrated in FIG. 31, comprises a CPU 6, a main memory 7, storage 8 and an interface 9.

For example, the above-mentioned object detection device 1 and other control devices are each installed on the computer 5. Furthermore, the operations of each of the above-mentioned processing units are stored, in the form of programs, in the storage 8. The CPU 6 reads the programs from the storage 8, loads them in the main memory 7, and executes the above-mentioned processes in accordance with said programs. Additionally, in accordance with the programs, the CPU 6 secures, in the main memory 7, a memory area corresponding to each of the above-mentioned storage units.

Examples of the storage 8 include HDDs (Hard Disk Drives), SSDs (Solid State Drives), magnetic disks, magneto-optic disks, CD-ROMs (Compact Disc Read-Only Memory), DVD-ROMs (Digital Versatile Disc Read-Only Memory), semiconductor memory devices and the like. The storage 8 may be internal media directly connected to a bus in the computer 5, or may be external media connected to the computer 5 by an interface 9 or a communication line. Additionally, when this program is distributed to the computer 5 by means of a communication line, the computer 5 that received the distributed program may load said program in the main memory 7 and execute the above-mentioned processes. In at least one embodiment, the storage 8 is a non-temporary tangible memory medium.

Additionally, the above-mentioned program may implement only some of the aforementioned functions. Furthermore, the above-mentioned program may be a so-called difference file (difference program), which is a file that allows the aforementioned functions to be performed by being combined with a program that is already recorded in a computer system.

While several embodiments of the present invention have been described, these embodiments are merely examples, and do not limit the scope of the invention. It is possible to make additions, various omissions, replacements and modifications to these embodiments within a range not departing from the gist of the invention.

(Supplementary Note 1)

An object detection device comprising a receiver, wherein the receiver comprises:

a reception unit configured to receive an RF reception signal that is a reflection of an RF transmission signal reflected from at least one target, the RF transmission signal having a frequency that is periodically swept;

an IF signal generation unit configured to generate an IF signal by mixing the RF transmission signal with the RF reception signal;

a position detection unit configured to detect a position of the target based on an amplitude in a spectrum computed from the IF signal having a frequency that is periodically swept;

a displacement detection unit configured to detect a displacement of the target based on a phase in a one-dimensional spectrum at the position of the target detected by the position detection unit, the phase in the one-dimensional spectrum being computed from the IF signal;

a speed detection unit configured to detect a speed of the target based on a plurality of the IF signals; and a target determination unit configured to identify a type of the target by using detection results from the displacement detection unit and detection results from the speed detection unit, or detection results from the displacement detection unit, environmental information defined at each position, and detection results from the position detection unit.

(Supplementary Note 2)

The object detection device according to Supplementary Note 1, wherein:

the position detection unit uses the one-dimensional spectrum as the spectrum, and detects the position of the target based on an amplitude peak in the one-dimensional spectrum.

(Supplementary Note 3)

The object detection device according to Supplementary Note 1 or 2, wherein:

the displacement detection unit determines that displacement of the target has been detected when, at the position of the target indicated by the phase of the one-dimensional spectrum, there is a change over time in the range to the target in each period of the IF signal.

(Supplementary Note 4)

The object detection device according to any one of Supplementary Notes 1 to 3, wherein:

the receiver comprises a first spectrum computation unit configured to compute the one-dimensional spectrum of the IF signal by applying a one-dimensional Fourier transform to the IF signal.

(Supplementary Note 5)

The object detection device according to Supplementary Note 1, wherein:

the position detection unit uses a two-dimensional spectrum computed from the IF signal as the spectrum, and detects the position of the target based on an amplitude peak in the two-dimensional spectrum; and the displacement detection unit detects the displacement of the target based on the phase of the one-dimensional spectrum at the position of the target detected by the position detection unit.

(Supplementary Note 6)

The object detection device according to Supplementary Note 5, wherein:

the receiver comprises a second spectrum computation unit configured to compute the two-dimensional spectrum of the IF signal by applying a two-dimensional Fourier transform to the IF signal.

(Supplementary Note 7)

The object detection device according to any one of Supplementary Notes 1 to 6, wherein:

the displacement detection unit, when the position detection unit has detected the positions of a plurality of targets, computes the displacement of the plurality of targets based on the phase of the one-dimensional spectrum corresponding to the position of each of the plurality of targets.

(Supplementary Note 8)

The object detection device according to any one of Supplementary Notes 1 to 7, wherein:

the displacement detection unit computes the displacement of only the targets for which the speed detected by the speed detection unit is not more than a threshold value.

(Supplementary Note 9)

The object detection device according to any one of Supplementary Notes 1 to 8, comprising:

a transmitter having an irradiation unit configured to emit an RF transmission signal having a frequency that is periodically swept.

(Supplementary Note 10)

An object detection method for an object detection device comprising a receiver, the object detection method comprising:

receiving an RF reception signal that is a reflection of an RF transmission signal reflected from at least one target, the RF transmission signal having a frequency that is periodically swept;

generating an IF signal by mixing the RF transmission signal with the RF reception signal;

detecting a position of the target based on an amplitude in a one-dimensional spectrum computed from the IF signal having a frequency that is periodically swept;

detecting a displacement of the target based on a phase in a one-dimensional spectrum computed from the IF signal, the phase in the one-dimensional spectrum being the phase at the detected position of the target;

detecting a speed of the target based on a plurality of the IF signals; and identifying a type of the target by using the displacement detection results and the speed detection results, or the displacement detection results, environmental information defined at each position, and the position detection results.

(Supplementary Note 11)

The object detection method for an object detection device according to Supplementary Note 10, wherein:

in the detecting the position, the position of the target is detected based on an amplitude peak in the one-dimensional spectrum.

(Supplementary Note 12)

An object detection method for an object detection device comprising a receiver, the object detection method comprising:

receiving an RF reception signal that is a reflection of an RF transmission signal reflected from at least one target, the RF transmission signal having a frequency that is periodically swept;

generating an IF signal by mixing the RF transmission signal with the RF reception signal;

detecting a position of the target based on an amplitude in a two-dimensional spectrum computed from the IF signal having a frequency that is periodically swept;

computing a one-dimensional spectrum from the IF signal;

detecting a displacement of the target based on a phase in the one-dimensional spectrum at the position of the target detected from the two-dimensional spectrum;

detecting a speed of the target based on a plurality of the IF signals; and identifying a type of the target by using the displacement detection results and the speed detection results, or the displacement detection results, environmental information defined at each position, and the position detection results.

(Supplementary Note 13)

The object detection method for an object detection device according to Supplementary Note 12, wherein:

in the detecting the position, the position of the target is detected based on a position of an amplitude peak in the two-dimensional spectrum.

(Supplementary Note 14)

The object detection method for an object detection device according to any one of Supplementary Notes 11 to 13, wherein:

in the identifying the type, the type of the target is identified based on the displacement of the target.

(Supplementary Note 15)

The object detection method for an object detection device according to any one of Supplementary Notes 11 to 13, comprising:

identifying a state of the target based on the displacement of the target.

(Supplementary Note 16)

An in-vehicle radar system comprising:

the object detection device according to any one of Supplementary Notes 1 to 9; and a control device; wherein the object detection device is configured to output, to the control device, the position of the target detected by the position detection unit and the displacement of the target detected by the displacement detection unit; and the control device is configured to control at least one of an engine power output and brakes based on the position of the target and the displacement of the target.

(Supplementary Note 17)

A monitoring radar system comprising:

the object detection device according to any one of Supplementary Notes 1 to 9; and a warning device; wherein the object detection device is configured to output, to the warning device, the displacement of the target detected by the displacement detection unit; and the warning device is configured to output an alarm based on the displacement.

(Supplementary Note 18)

A program that makes a computer in an object detection device comprising a receiver execute processes, the processes comprising:

emitting an RF transmission signal having a frequency that is periodically swept;

receiving an RF reception signal that is a reflection of the RF transmission signal reflected from at least one target, the RF transmission signal having a frequency that is periodically swept;

generating an IF signal by mixing the RF transmission signal with the RF reception signal;

detecting a position of the target based on an amplitude in a one-dimensional spectrum computed from the IF signal having a frequency that is periodically swept;

detecting a displacement of the target based on a phase in the one-dimensional spectrum at the detected position of the target;

detecting a speed of the target based on a plurality of the IF signals; and identifying a type of the target by using the displacement detection results and the speed detection results, or the displacement detection results, environmental information defined at each position, and the position detection results.

(Supplementary Note 19)

The program according to Supplementary Note 18, wherein:

in the detecting the position, the position of the target is detected based on an amplitude peak in the one-dimensional spectrum.

(Supplementary Note 20)

A program that makes a computer in an object detection device comprising a receiver execute processes, the processes comprising:

receiving an RF reception signal that is a reflection of an RF transmission signal reflected from at least one target, the RF transmission signal having a frequency that is periodically swept;

generating an IF signal by mixing the RF transmission signal with the RF reception signal;

detecting a position of the target based on an amplitude in a two-dimensional spectrum computed from the IF signal having a frequency that is periodically swept;

computing a one-dimensional spectrum from the IF signal;

detecting a displacement of the target based on a phase in the one-dimensional spectrum at the position of the target detected from the two-dimensional spectrum;

detecting a speed of the target based on a plurality of the IF signals; and identifying a type of the target by using the displacement detection results and the speed detection results, or the displacement detection results, environmental information defined at each position, and the position detection results.

(Supplementary Note 21)

The program according to Supplementary Note 20, wherein:

in the detecting the position, the position of the target is detected based on an amplitude peak in the two-dimensional spectrum.

(Supplementary Note 22)

The program according to any one of Supplementary Notes 18 to 21, wherein:

in the identifying the type, the type of the target is identified based on the displacement of the target.

(Supplementary Note 23)

The program according to any one of Supplementary Notes 18 to 21, comprising:

identifying a state of the target based on the displacement of the target.

Priority is claimed on Japanese Patent Application No. 2017-098561, filed May 17, 2017, the entire disclosure of which is incorporated herein by reference.

INDUSTRIAL APPLICABILITY

According to the present invention, it is possible to detect moving bodies without making use of complicated processes or special equipment.

REFERENCE SIGNS LIST

1 Object detection device
5 Computer
6 CPU
7 Main memory
8 Storage
9 Interface
10 Transmitter
20 Receiver
101 Irradiation unit
102, 205 Control unit
103, 206 Storage unit
200 In-vehicle radar system
201 Reception unit
202 IF signal generation unit
203 Position detection unit
204 Displacement detection unit
207 Spectrum computation unit
208 Speed detection unit
209 Target determination unit
300 Control device
400 Monitoring radar system
500 Warning device

The invention claimed is:

1. An object detection device comprising a receiver, wherein the receiver comprises:
   at least one memory configured to store instructions; and
   at least one processor configured to execute the instructions to:
   receive an RF (Radio Frequency) reception signal that is a reflection of an RF transmission signal reflected from a target, the RF transmission signal having a frequency that is periodically swept;
   generate an IF (Intermediate Frequency) signal by mixing the RF transmission signal with the RF reception signal;
   detect a position of the target based on an amplitude in a spectrum computed from the IF signal having the frequency that is periodically swept;
   detect a displacement of the target based on a phase in a one-dimensional spectrum at the detected position of the target, the phase in the one-dimensional spectrum being computed from the IF signal;
   detect a speed of the target based on a plurality of IF signals including the IF signal; and
   identify whether a person is moving or the person is moving a body without the person moving by using a change in pattern of the detected displacement over time, a detection result of the speed, a degree of variation in the detected displacement over time, environmental information defined at the position, and a detection result of the position.

2. The object detection device according to claim 1, wherein the at least one processor is configured to execute the instructions to:
use the one-dimensional spectrum as the spectrum, and detect the position of the target based on an amplitude peak in the one-dimensional spectrum.

3. The object detection device according to claim 1, wherein the at least one processor is configured to execute the instructions to:
determine that the displacement of the target has been detected when, at the position of the target indicated by the phase of the one-dimensional spectrum, there is a change over time in a range to the target in each of a plurality of periods of the IF signal.

4. The object detection device according to claim 1, wherein the at least one processor is configured to execute the instructions to:
compute the one-dimensional spectrum of the IF signal by applying a one-dimensional Fourier transform to the IF signal.

5. The object detection device according to claim 1, wherein the at least one processor is configured to execute the instructions to:
use a two-dimensional spectrum computed from the IF signal as the spectrum, and detect the position of the least one target based on an amplitude peak in the two-dimensional spectrum; and
detect the displacement of the target based on the phase in the one-dimensional spectrum at the detected position of the target.

6. The object detection device according to claim 5, wherein the at least one processor is configured to execute the instructions to:
compute the two-dimensional spectrum of the IF signal by applying a two-dimensional Fourier transform to the IF signal.

7. The object detection device according to claim 1, wherein the target is one of a plurality of targets having a plurality of corresponding positions, and the at least one processor is configured to execute the instructions to:
compute, when the corresponding positions of the plurality of targets have been detected, the displacement of the plurality of targets based on the phase of the one-dimensional spectrum corresponding to the corresponding position of each of the plurality of targets.

8. The object detection device according to claim 1, wherein the target is one of a plurality of targets, and the at least one processor is configured to execute the instructions to:
compute the displacement of only the targets for which the detected speed is not more than a threshold value.

9. The object detection device according to claim 1, further comprising:
a transmitter configured to emit the RF transmission signal having the frequency that is periodically swept.

10. An in-vehicle radar system comprising:
a control device; and
an object detection device comprising a receiver, the receiver comprises:
at least one memory configured to store instructions; and
at least one processor configured to execute the instructions to:
receive an RF (Radio Frequency) reception signal that is a reflection of an RF transmission signal reflected from a target, the RF transmission signal having a frequency that is periodically swept;
generate an IF (Intermediate Frequency) signal by mixing the RF transmission signal with the RF reception signal;
detect a position of the target based on an amplitude in a spectrum computed from the IF signal having the frequency that is periodically swept;
detect a displacement of the target based on a phase in a one-dimensional spectrum at the detected position of the target, the phase in the one-dimensional spectrum being computed from the IF signal;
detect a speed of the target based on a plurality of the IF signals; and
identify a whether a person is moving or the person is moving a body without the person moving by using a change in pattern of the detected displacement over time, a detection result of the speed, a degree of variation in the detected displacement over time, environmental information defined at the position, and a detection result of the position, wherein
the object detection device is configured to output, to the control device, the detected position of the target and the detected displacement of the target,
the control device is configured to control at least one of an engine power output and brakes based on the detected position of the target and the detected displacement of the target.

11. A monitoring radar system comprising:
a warning device; and
an object detection device comprising a receiver, wherein the receiver comprises:
at least one memory configured to store instructions; and
at least one processor configured to execute the instructions to:
receive an RF (Radio Frequency) reception signal that is a reflection of an RF transmission signal reflected from a target, the RF transmission signal having a frequency that is periodically swept;
generate an IF (Intermediate Frequency) signal by mixing the RF transmission signal with the RF reception signal;
detect a position of the target based on an amplitude in a spectrum computed from the IF signal having the frequency that is periodically swept;
detect a displacement of the target based on a phase in a one-dimensional spectrum at the detected position of the target, the phase in the one-dimensional spectrum being computed from the IF signal;
detect a speed of the target based on a plurality of the IF signals; and
identify whether a person is moving or the person is moving a body without the person moving by using a change in pattern of the detected displacement over time, a detection result of the speed, a degree of variation in the detected displacement over time, environmental information defined at the position, and a detection result of the position, wherein
the object detection device is configured to output, to the warning device, the detected displacement of the target,
the warning device is configured to output an alarm based on the detected displacement.

* * * * *